(12) United States Patent
Ishikura et al.

(10) Patent No.: US 9,240,869 B2
(45) Date of Patent: Jan. 19, 2016

(54) WIRELESS COMMUNICATION SYSTEM

(75) Inventors: Katsutoshi Ishikura, Osaka (JP); Koichi Tsunekawa, Osaka (JP); Toshiaki Kameno, Osaka (JP); Yoshio Konno, Osaka (JP); Keiji Hikoso, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 323 days.

(21) Appl. No.: 13/511,599

(22) PCT Filed: Nov. 25, 2010

(86) PCT No.: PCT/JP2010/070994
§ 371 (c)(1),
(2), (4) Date: Jun. 4, 2012

(87) PCT Pub. No.: WO2011/065407
PCT Pub. Date: Jun. 3, 2011

(65) Prior Publication Data
US 2012/0263130 A1    Oct. 18, 2012

(30) Foreign Application Priority Data

Nov. 25, 2009    (JP) .................................. 2009-267517

(51) Int. Cl.
*H04W 4/00*        (2009.01)
*H04L 5/00*        (2006.01)
(Continued)

(52) U.S. Cl.
CPC ............. *H04L 5/001* (2013.01); *H04W 72/042* (2013.01); *H04W 72/02* (2013.01)

(58) Field of Classification Search
CPC .......... H04W 72/0413; H04W 72/042; H04W 72/0453
USPC .......... 370/329, 341, 437, 343, 344; 455/450, 455/464, 509
See application file for complete search history.

(56) References Cited

U.S. PATENT DOCUMENTS

2003/0109284 A1    6/2003  Akerberg et al.
2005/0063330 A1*   3/2005  Lee et al. ...................... 370/328
(Continued)

FOREIGN PATENT DOCUMENTS

CN    101404539 A    4/2009
CN    101505538 A    8/2009
(Continued)

OTHER PUBLICATIONS

3GPP Letter R4-091464, Mar. 23-27, 2009.*
(Continued)

*Primary Examiner* — Mang Yeung
(74) *Attorney, Agent, or Firm* — Birch, Stewart, Kolasch & Birch, LLP.

(57) ABSTRACT

In a wireless communication system, a terminal device and a base station device communicate using frequency bands selected from among a plurality of frequency bands. The base station device selects a frequency band used for a downlink and a frequency band used for an uplink as frequency bands used for communication with the terminal device from among the plurality of frequency bands, selects an association between the frequency band used for the downlink and the frequency band used for the uplink among the selected frequency bands, and transmits information indicating the selected frequency bands and information indicating the association containing identification information of the association using a signal specific to the terminal device.

7 Claims, 21 Drawing Sheets

| ASSOCIATION NUMBER | DL CC IDENTIFICATION NUMBER | UL CC IDENTIFICATION NUMBER |
|---|---|---|
| 1 | 1, 2 | 1 |
| 2 | 3, 4 | 2 |
| 3 | 5 | 3 |
| --- | --- | --- |

(51) Int. Cl.
*H04W 72/04* (2009.01)
*H04W 72/02* (2009.01)

(56) References Cited

U.S. PATENT DOCUMENTS

| | | | |
|---|---|---|---|
| 2006/0083267 | A1 | 4/2006 | Laroia et al. |
| 2008/0013480 | A1 | 1/2008 | Kapoor et al. |
| 2010/0285809 | A1* | 11/2010 | Lindstrom et al. ............ 455/450 |
| 2010/0329200 | A1* | 12/2010 | Chen et al. ................... 370/329 |
| 2013/0201945 | A1 | 8/2013 | Sun |

FOREIGN PATENT DOCUMENTS

| | | |
|---|---|---|
| JP | 2005-512426 A | 4/2005 |
| JP | 2007-511933 A | 5/2007 |
| JP | 2009-536798 A | 10/2009 |
| JP | 2009-544240 A | 12/2009 |
| WO | WO 03/049475 A1 | 6/2003 |
| WO | WO 2006/044661 A2 | 4/2006 |
| WO | WO 2007/132365 A2 | 11/2007 |
| WO | WO 2008/008920 A2 | 1/2008 |
| WO | WO 2008/085009 A1 | 7/2008 |
| WO | WO 2009029015 A1 * | 3/2009 |

OTHER PUBLICATIONS

3GPP Letter R1-090723 (Feb. 9-13, 2009), "Support of non-backward compatible component carriers," TSG-RAN WG1 Meeting #56.

3GPP Letter R1-091701 (May 8, 2009), "Asymmetric band aggregation and anchor carrier," TSG-RAN WG1 #57.

3GPP Letter R1-091993 (May 4-8, 2009), "Issues on Asymmetric Carrier Aggregation," TSG RAN WG1 #57.

3GPP Letter R4-091464 (Mar. 23-27, 2009), "Prioritized Deployment Scenarios for LTE-Advanced studies," TSG RAN WG4 #50bis.

3GPP TR36.814 V0.4.1 (Feb. 2009), "3rd Generation Partnership Project; Technical Specification Group Radio Access Network; Further Advancements for E-UTRA Physical Layer Aspects," (Release 9).

3GPP TS36.101 V8.4.0 (Dec. 2008), "3rd Generation Partnership Project; Technical Specification Group Radio Access Network; Evolved Universal Terrestrial Radio Access (E-UTRA); User Equipment (UE) radio transmission and reception," Release 8.

3GPP TS36.331 V8.5.0 (Mar. 2009), "3rd Generation Partnership Project; Technical Specification Group Radio Access Network; Evolved Universal Terrestrial Radio Access (E-UTRA); Radio Resource Control (RRC); Protocol specification," Release 8.

LG Electronic Inc., Yuk, et al., "Considerations for Carrier Aggregation", IEEE 802.16 Broadband Wireless Access Working Group, Kobe, Japan, Sep. 5, 2008, pp. 1-10.

NTT Docomo, T-Mobile Intl, CMCC, Orange, Vodafone, Telecom Italia, "Prioritized Deployment Scenarios for LTE-Advanced Studies", 3GPP TSG-RAN WG4 Meeting #50, Athens, Greece, Feb. 9-13, 2009, R4-091011, pp. 2-6.

* cited by examiner

FIG. 5

| ASSOCIATION NUMBER | DL CC IDENTIFICATION NUMBER | UL CC IDENTIFICATION NUMBER |
|---|---|---|
| 1 | 1, 2 | 1 |
| 2 | 3, 4 | 2 |
| 3 | 5 | 3 |
| - | - | - |

FIG. 6

| DL | 1 | DL | 2 | UL | 1 | DL | 3 | DL | 4 | UL | 2 | DL | 5 | UL | 3 |

FIG. 7

| ASSOCIATION NUMBER | DL CC IDENTIFICATION NUMBER | UL CC IDENTIFICATION NUMBER |
|---|---|---|
| 1 | 1 | 1 |
| 2 | 2 | 1 |
| 3 | 3 | 2 |
| 4 | 4 | 2 |
| 5 | 5 | 2 |
| 6 | 6 | 2 |
| 7 | 5 | 3 |
| 8 | 6 | 3 |

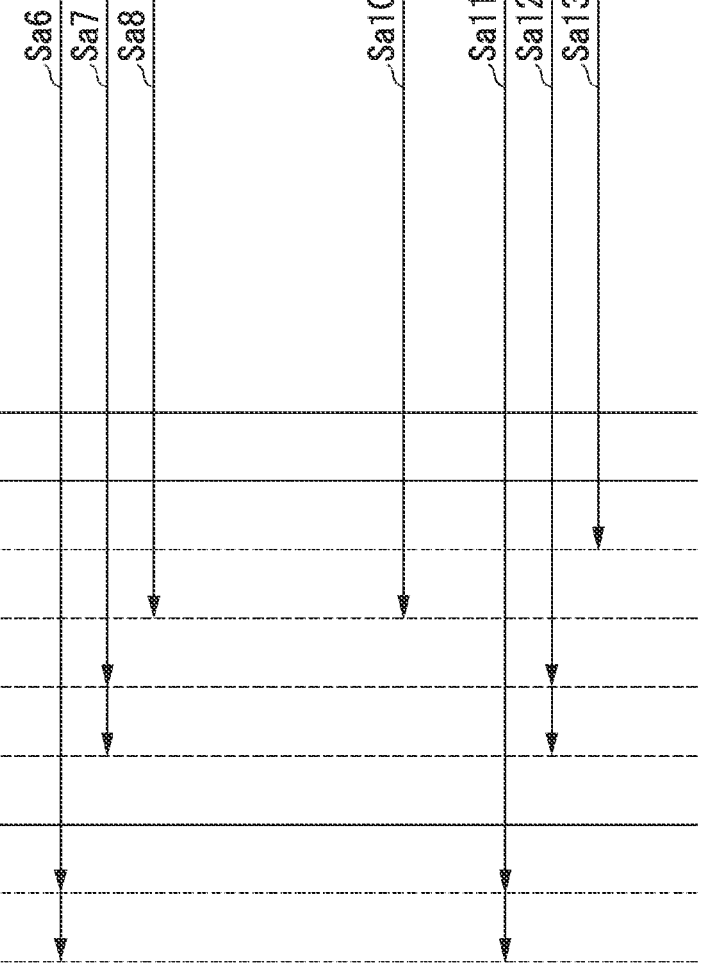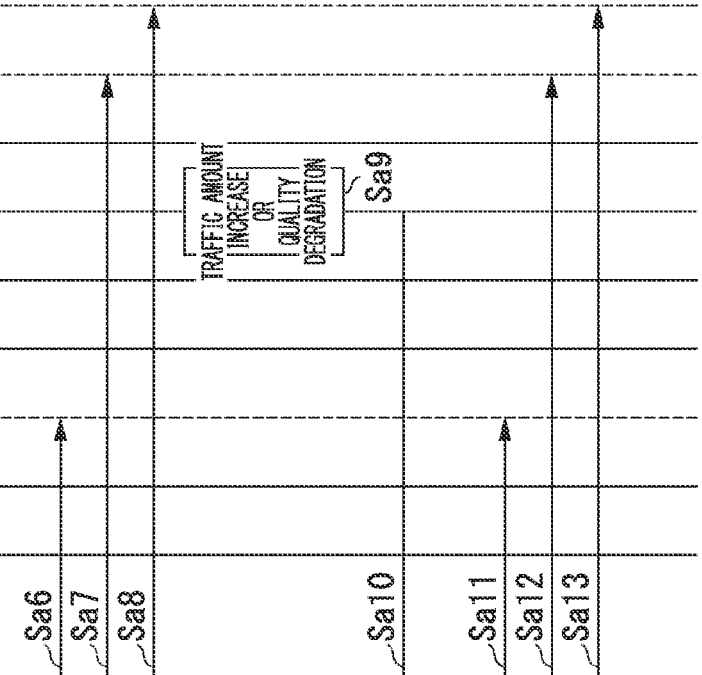
FIG. 8

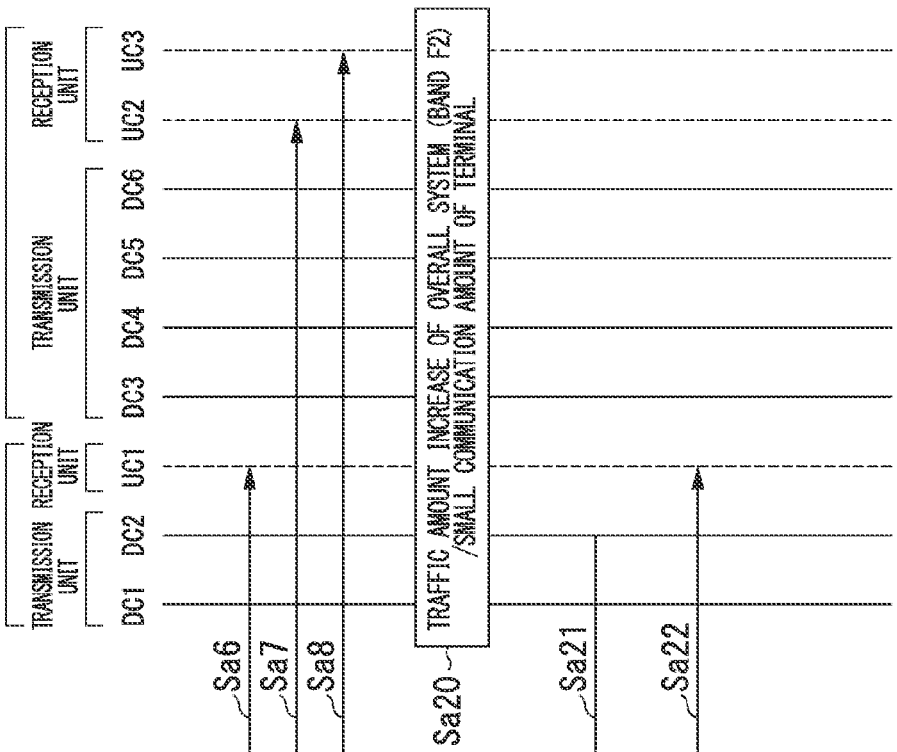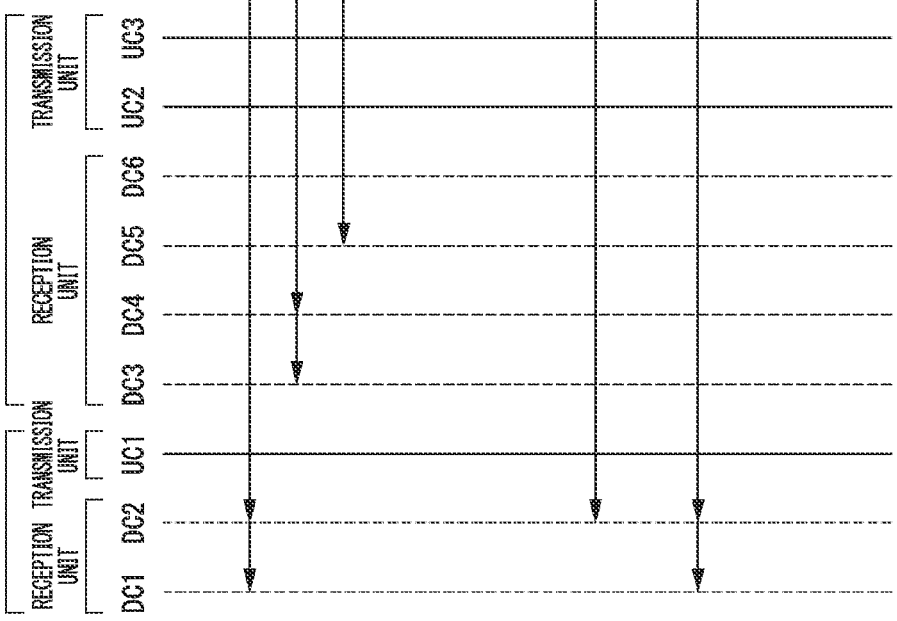
FIG. 9

FIG. 12

| GROUP NUMBER | DL CC IDENTIFICATION NUMBER | UL CC IDENTIFICATION NUMBER |
| --- | --- | --- |
| 1 | 1, 2 | 1 |
| 2 | 3, 4, 5 | 2 |
| 3 | 6, 7 | 3, 4 |
| 4 | 8 | 5, 6 |

FIG. 14

| GROUP NUMBER | DL CC IDENTIFICATION NUMBER | UL CC IDENTIFICATION NUMBER |
|---|---|---|
| 1 | 1, 2 | 1 |
| 2 | 3, 4, 5 | 2 |
| — | — | — |
| — | — | — |

FIG. 15

| GROUP NUMBER | DL CC IDENTIFICATION NUMBER | UL CC IDENTIFICATION NUMBER | DL FREQUENCY | UL FREQUENCY |
|---|---|---|---|---|
| 1 | 1, 2 | 1 | f1DL | f1UL |
| 2 | 3, 4, 5 | 2 | f2DL | f2UL |
| — | — | — | — | — |
| — | — | — | — | — |

FIG. 16

| GROUP NUMBER | DL CC IDENTIFICATION NUMBER | UL CC IDENTIFICATION NUMBER | DL FREQUENCY | UL FREQUENCY |
|---|---|---|---|---|
| 1 | 1, 2 | 1 | f1DL | f1UL |
| 2 | 3, 4, 5 | 2 | f2DL | f2UL |
| 3 | 6, 7 | 3, 4 | f3DL | f3UL |
| 4 | 8 | 5, 6 | f4DL | f4UL |

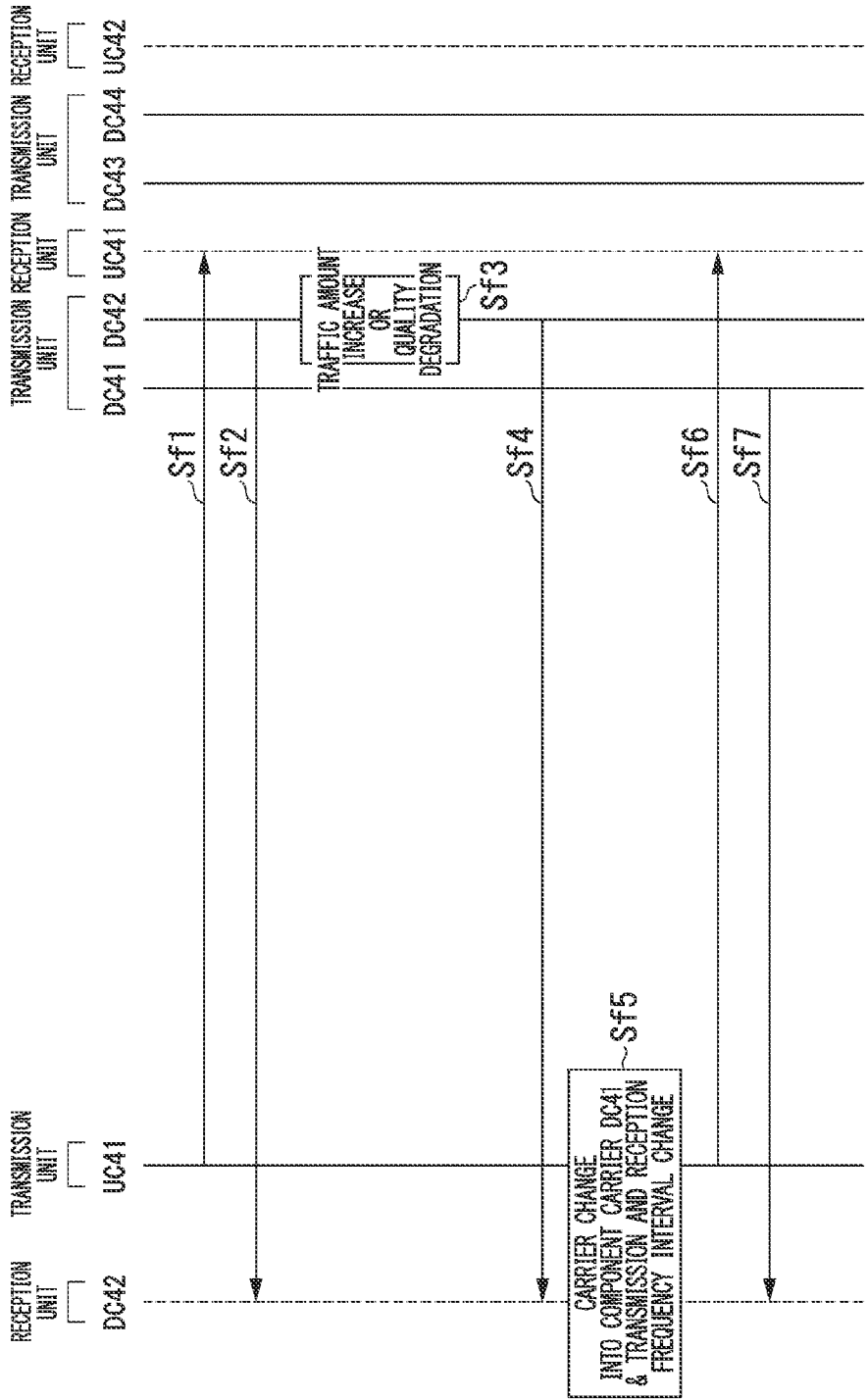

WIRELESS COMMUNICATION SYSTEM

TECHNICAL FIELD

The present invention relates to a wireless communication system.

This application claims priority to Japanese Patent Application No. 2009-267517 filed on Nov. 25, 2009 in the Japan Patent Office (JPO), the content of which is hereby incorporated by reference.

BACKGROUND ART

For example, a WCDMA (Wideband Code Division Multiple Access) system has been used as a current 3rd generation mobile communication system. In the WCDMA system, a downlink (DL) frequency and an uplink (UL) frequency to be used are defined in a one-to-one correspondence relationship. That is, if a downlink frequency to be used by a terminal is determined, an uplink frequency to be transmitted by the terminal is also correspondingly determined. For example, in the WCDMA system, an interval between transmission and reception frequencies in a 2-GHz frequency band (band 1) is fixed to 190 MHz.

Further, in a 3GPP (3rd Generation Partnership Project), a specification of a current LTE (Long Term Evolution (of the 3rd generation)) communication system is being prepared. In Non-Patent Document 1, chapter 5.7.4 and Non-Patent Document 2, chapter 6.3.1, which are an LTE specification (Release 8), a default value of one frequency interval is defined for every frequency band as the transmission and reception frequency interval (the same value as that in WCDMA). Further, in specifications subsequent to Release 9, the number of the transmission and reception frequency intervals is not limited to one in each frequency band, and a new study appears to be necessary. Further, as a method of notifying of the transmission and reception interval, an uplink transmission frequency and a transmission bandwidth can be notified of using system common report information. Information of the same transmission frequency and transmission bandwidth is also included as a parameter notified of in handover. In other words, in the specifications, an uplink frequency can be freely set for a downlink frequency, that is, the transmission and reception frequency interval can be freely set. However, setting of a plurality of transmission and reception frequencies is not described in detail.

Further, LTE-A (LTE-Advanced) has been studied as an LTE communication system. LTE-A is required to realize higher speed communication than LTE and to support a wider band than LTE (a band of 100 MHz, surpassing the band of 20 MHz in LTE). However, a wide band of a continuous frequency domain is difficult to secure worldwide for LTE-A, and it is desirable to maintain compatibility with LTE as far as possible. Accordingly, carrier aggregation (CA) for realizing high-speed, large-capacity communication by securing a bandwidth of a maximum of 100 MHz by collecting a plurality of carriers each having a bandwidth of up to 20 MHz to perform communication was proposed and agreed upon at the meeting 3GPP RAN1 # 53b (see chapter 5 of Non-Patent Document 3). In the carrier aggregation, a carrier of up to 20 MHz is called a component carrier (CC). For the carrier aggregation, a detailed specification such as signaling, channel arrangement, and mapping is expected to be formulated in the future.

A UL/DL asymmetric frequency band has also been studied in LTE-A. A system of related art is a UL/DL symmetric frequency system and is not required to change a transmission and reception frequency interval. However, in the case of the UL/DL asymmetric frequency band system, a plurality of frequency intervals are likely to be needed for every band as the transmission and reception frequency interval (when UL/DL frequency bands of the CCs are the same and the CCs differ in number). In this case, a value of the transmission and reception frequency interval and how to control the interval have been studied but not specifically proposed (Non-Patent Documents 4, 5 and 6). Also, how to select frequency bands of a downlink and an uplink for carrier aggregation and to control the carrier aggregation in a terminal when the carrier aggregation is performed has not been specifically proposed.

Further, in LTE-A, it is necessary to determine a frequency band and how to perform a CA for communication to some extent in 3GPP RAN4, and carrier aggregation frequency scenarios disclosed in Non-Patent Document 7 have been studied. In Non-Patent Document 7, a frequency band to be used and how to perform the carrier aggregation were studied. For example, various CA frequency scenarios are disclosed, such as use of CCs adjacent on a frequency axis, use of CCs separate on a frequency axis, and carrier aggregation in different frequency bands.

PRIOR ART DOCUMENT

Non-Patent Document

Non-Patent Document 1: 3GPP TS36. 101 V8.4.0
Non-Patent Document 2: 3GPP TS36. 331 V8.5.0
Non-Patent Document 3: 3GPP TR36. 814 V0.4.1
Non-Patent Document 4: 3GPP Letter R1-091701
Non-Patent Document 5: 3GPP Letter R1-090723
Non-Patent Document 6: 3GPP Letter R1-091993
Non-Patent Document 7: 3GPP Letter R4-091464

DISCLOSURE OF INVENTION

Problem to be Solved by the Invention

However, in a wireless communication system in which a terminal device and a base station device communicate using a frequency band selected from among a plurality of frequency bands such as component carriers in LTE-A, a frequency band of a downlink and a frequency band of an uplink to be subjected to association for communication are not known. Thus, communication control is very difficult or communication may not be possible.

For example, when a component carrier of an uplink to transmit ACK/NACK information with respect to data received using a component carrier of a downlink is not associated in the terminal device, the base station device must monitor all component carriers of the uplink in order to detect the ACK/NACK information or cannot determine data to which detected ACK/NACK information corresponds.

In a current LTE specification, information of a frequency band of the uplink can be acquired for association from report information of each component carrier of the downlink. However, since the terminal device cannot acquire the report information until a transmission cycle of the report information, it is impossible to flexibly perform carrier aggregation change or handover, causing communication delay in the carrier aggregation change or the handover.

The present invention has been made in view of the circumstances described above, and an object of the present invention is to provide a wireless communication system capable of flexibly performing communication through association between a frequency band of a downlink and a frequency band of an uplink even when a terminal device and a base station device communicate using a frequency band selected from among a plurality of frequency bands.

Means to Solve the Problem (1) An aspect of the present invention is a wireless communication system in which a terminal device and a base station device communicate using frequency bands selected from among a plurality of frequency bands, wherein: the base station device selects a frequency band used for a downlink and a frequency band used for an uplink as frequency bands used for communication with the terminal device from among the plurality of frequency bands, selects an association between the frequency band used for the downlink and the frequency band used for the uplink among the selected frequency bands, and transmits information indicating the selected frequency bands and information indicating the association containing identification information of the association using a signal specific to the terminal device.

(2) In the above-described wireless communication system, the association between the frequency band used for the downlink and the frequency band used for the uplink may be determined in advance, and the information indicating the selected frequency bands and the information indicating the association may be transmitted by transmitting the identification information of the association.

(3) In the above-described wireless communication system, the terminal device may transmit information indicating the association available in the terminal device among the associations between the frequency band used for the downlink and the frequency band used for the uplink to the base station device.

(4) In the above-described wireless communication system, the base station device may re-select, during communication with the terminal device, the frequency band used for the downlink and the frequency band used for the uplink as frequency bands used for communication with the terminal device being in communication from among the plurality of frequency bands, select an association between the frequency band used for the downlink and the frequency band used for the uplink among the selected frequency bands, and transmits information indicating the selected frequency bands and information indicating the association using a signal specific to the terminal.

(5) In the above-described wireless communication system, the base station device may transmit the information indicating the association using a frequency band determined in advance between the base station device and the terminal device.

(6) In the above-described wireless communication system, the base station device may select a group used for communication with the terminal device from among a plurality of groups in which the association between the downlink and the uplink has been determined, each group including the frequency band used for the downlink and the frequency band used for the uplink, and transmit information indicating the group as the information indicating the selected frequency band and the information indicating the association using a signal specific to the terminal.

(7) In the above-described wireless communication system, the terminal device may store group identification information for identifying the group, information indicating the frequency band used for the downlink and the frequency band used for the uplink constituting the group, and information indicating the association between the downlink and the uplink in association with one another in advance, and the information indicating the group transmitted by the base station device may be group identification information for identifying the group.

(8) In the above-described wireless communication system, the information indicating the group may include information indicating a carrier frequency set in the terminal device so that the terminal device receives a signal of the frequency band belonging to the group, and a carrier frequency set in the terminal device so that the terminal device transmits a signal of the frequency band belonging to the group.

(9) In the above-described wireless communication system, the terminal device may transmit information indicating combinations of the carrier frequencies available in the terminal device to the base station device, and the base station device may select a combination of carrier frequencies used for communication with the terminal device from among the combinations of the available carrier frequencies indicated by the information received from the terminal device.

(10) In the above-described wireless communication system, the base station device may select a CA pattern used for communication with the terminal device from among a plurality of CA patterns in which the association between the downlink and the uplink has been determined, each CA pattern including the frequency band used for the downlink and the frequency band used for the uplink simultaneously available to the terminal device, and transmit information indicating the CA pattern as the information indicating the selected frequency band and the information indicating the association using a signal specific to the terminal.

(11) In the above-described wireless communication system, the terminal device may store pattern identification information for identifying the CA pattern, information indicating the frequency band used for the downlink and the frequency band used for the uplink constituting the CA pattern, and information indicating the association between the downlink and the uplink in association with one another in advance, and the information indicating the CA pattern transmitted by the base station device may be the CA pattern identification information for identifying the CA pattern.

(12) In the above-described wireless communication system, the CA pattern may be uniquely determined for the frequency band used for the downlink.

(13) In the above-described wireless communication system, the terminal device may transmit information indicating the CA patterns available in the terminal device to the base station device, and the base station device selects a combination of carrier frequencies used for communication with the terminal device from among the available CA patterns indicated by the information received from the terminal device.

(14) In the above-described wireless communication system, when the base station device selects the group used for communication with the terminal device, the base station device may select the group based on at least one of a communication capacity of the frequency band of the uplink and the frequency band of the downlink used to perform communication, service provided to the terminal device, and a version of the terminal device.

(15) In the above-described wireless communication system, when the base station device selects the CA pattern used for communication with the terminal device, the base station device may select the CA pattern based on at least one of a communication capacity of the frequency band of the uplink and the frequency band of the downlink used to perform communication, service provided to the terminal device, and a version of the terminal device.

(16) In the above-described wireless communication system, the terminal device may use one frequency band of the uplink and one frequency band of the downlink to perform communication, and the base station device may notify of the information indicating the association when changing either the frequency band of the uplink or the frequency band of the downlink.

Effect of the Invention

According to the present invention, it is possible to flexibly perform communication through the association between the frequency band of the downlink and the frequency band of the uplink even when the terminal device and the base station device communicate using the frequency band selected from among the plurality of frequency bands.

BRIEF DESCRIPTION OF THE DRAWINGS

FIG. 5 is a diagram showing an example of a format of a notification signal for a carrier aggregation setting request in the first embodiment.

FIG. 6 is a diagram showing a first variant of the format of the notification signal for the carrier aggregation setting request in the first embodiment.

FIG. 7 is a diagram showing an example of candidates for association stored in an association candidate storage unit 310 in the first embodiment.

FIG. 8 is a sequence diagram illustrating a process in which a carrier aggregation combination is changed as communication becomes difficult during high-speed packet communication in the first embodiment.

FIG. 9 is a sequence diagram illustrating a process in which a carrier aggregation combination is changed from high-speed packet communication to low-speed packet communication in the first embodiment.

FIG. 12 is a diagram showing an example of stored content of a group storage unit 322 in the second embodiment.

FIG. 14 is a diagram showing an example of content of a carrier aggregation setting request of FIG. 13 in the second embodiment.

FIG. 15 is a diagram showing an example of content of a carrier aggregation setting request in a variant of the second embodiment.

FIG. 16 is a diagram showing an example of content stored in a group storage unit 322 of the base station device 30a in the same variant.

FIG. 26 is a communication sequence diagram when only a component carrier of a downlink is changed during communication in the fifth embodiment.

BEST MODE FOR CARRYING OUT THE INVENTION

<First Embodiment>

Figure 1:
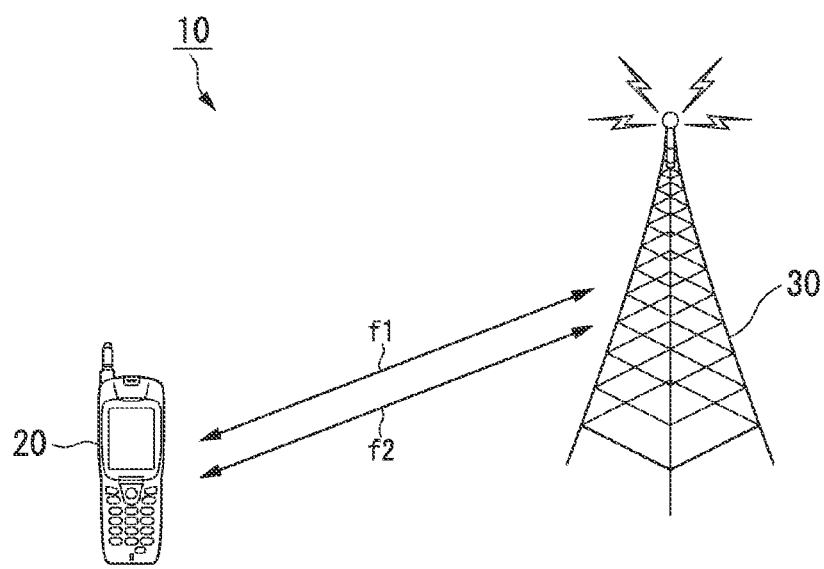
FIG. 1 is a conceptual diagram showing a schematic configuration of a mobile communication system 10 according to a first embodiment of the invention.

Hereinafter, a first embodiment of the present invention will be described with reference to the accompanying drawings. FIG. 1 is a conceptual diagram showing a schematic configuration of a mobile communication system 10 according to the first embodiment of the invention. In the present embodiment, the mobile communication system 10, which is a wireless communication system, includes a terminal device 20 and a base station device 30. Wireless communication is performed between the base station device 30 and the terminal device 20. A plurality of component carriers (frequency bands) selected from among component carriers in two frequency bands f1 and f2, that is, six component carriers DC1, DC2, DC3, DC4, DC5 and DC6 of a downlink, which are frequency bands having a frequency bandwidth of 20 MHz or less, are transmitted from the base station device 30 to the terminal device 20. Similarly, a plurality of component carriers selected from among component carriers in the two frequency bands f1 and f2, that is, three component carriers UC1, UC2 and UC3 of an uplink, which are frequency bands having a frequency bandwidth of 20 MHz or less, are transmitted from the terminal device 20. Further, while only one terminal device 20 is shown in FIG. 1, the base station device 30 may simultaneously perform the wireless communication with a plurality of terminal devices 20.

Figure 2:
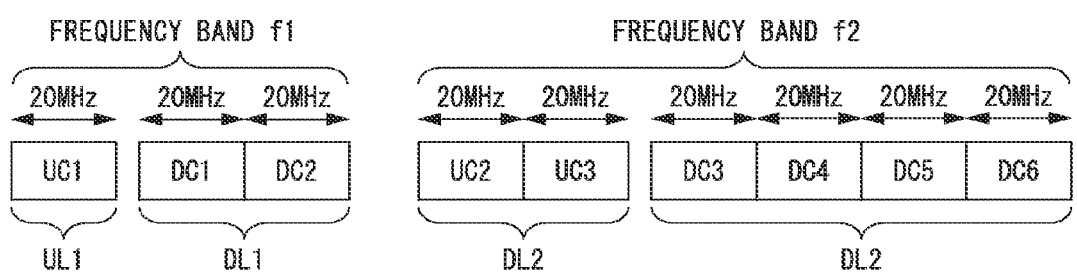
FIG. 2 is a conceptual diagram showing structures of frequency bands f1 and f2 in the first embodiment.

FIG. 2 is a conceptual diagram showing structures of the frequency bands f1 and f2 in the present embodiment. As shown in FIG. 2, component carriers DC1 and DC2 indicated by reference numeral DL1 among downlinks that are links from the base station device 30 to the terminal device 20 are transmitted in the frequency band f1. Similarly, component carriers DC3, DC4, DC5 and DC6 of reference numeral DL2 among the downlinks are transmitted in the frequency band f2. Further, a component carrier UC1 indicated by reference numeral UL1 among uplinks that are links from the terminal device 20 to the base station device 30 is transmitted in the frequency band f1. Similarly, component carriers UC2 and UC3 indicated by reference numeral UL2 among the uplinks are transmitted in the frequency band f2. Further, in the present embodiment, a frequency bandwidth of each component carrier is 20 MHz.

Here, in the present embodiment, an example in an FDD (Frequency Division Duplex) system is shown and communication in the downlink DL and the uplink UL is performed at different frequencies.

Further, control for the component carriers DC1 and DC2 is performed using the component carrier UC1. Also, control for the component carrier UC1 is performed in the component carrier DC1 or DC2, such that closed control is performed using the frequency band f1. Similarly, control for the component carriers DC3 and DC4 is performed using the component carrier UC2, and control for the component carrier UC2 is performed using the component carrier DC3 or DC4. Also, control for the component carrier DC5 and DC6 is performed using the component carrier UC3, and control for the component carrier UC3 is performed using the component carrier DC5 or DC6.

While, for example, the control for the component carrier UC1 is performed using the component carrier DC1 or DC2 as described above, such a description shows that either the component carrier DC1 or the component carrier DC2 may be used. For example, there may be a rule that the component carrier at a lower frequency among the component carriers DC1 and DC2 be used or there may be a rule that any one of the component carrier DC1 and the component carrier DC2 be determined according to a value of identification information of the terminal device 20.

Accordingly, in the frequency band f2, closed control is performed in two groups. That is, in the present embodiment, transmission and reception are performed through association between the downlink and the uplink in each of the two groups of the band f1 and the band f2. Here, the band f1 and the band f2 refer to available frequency bands defined in the system. For example, the band f1 and the band f2 refer to a 2 GHz band (uplink 1920 MHz-1980 MHz: downlink 2110 MHz-2170 MHz) or an 800 MHz band (uplink 824 MHz-849 MHz: downlink 869 MHz-894 MHz).

As described above, in the present embodiment, a plurality of component carriers of the downlink and the uplink are simultaneously used, that is, carrier aggregation (CA) is performed to perform high-speed communication. Also, communication is performed through association between the component carrier(s) of the downlink and the component carrier(s) of the uplink, thereby simplifying system control.

Figure 3:
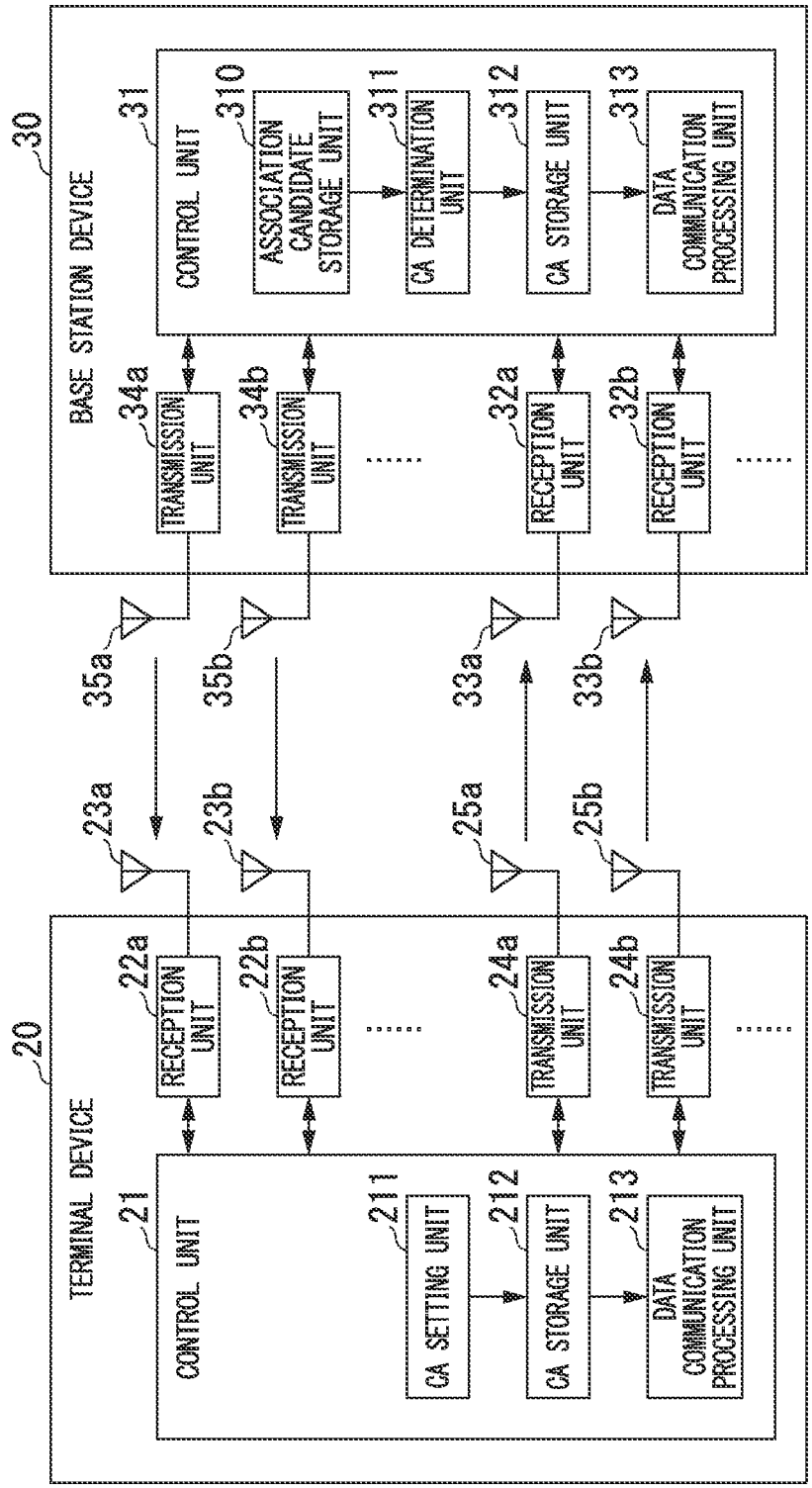
FIG. 3 is a schematic block diagram showing configurations of a terminal device 20 and a base station device 30 in the first embodiment.

FIG. 3 is a schematic block diagram showing configurations of a terminal device 20 and a base station device 30. The terminal device 20 includes a plurality of reception antennas 23a, 23b . . . for receiving a signal from the base station device 30, a plurality of reception units 22a, 22b . . . for demodulating the received reception signal, a plurality of transmission units 24a, 24b . . . for generating data to be transmitted to the base station device 30, a plurality of transmission antennas 25a, 25b . . . for transmitting transmission data generated by the transmission units 24a, 24b . . . , and a control unit 21 for performing overall control of the terminal device 20. The terminal device 20 generally includes various functions, including a display unit and a manipulation unit that are user input/output interfaces, which are, however, not shown herein. Further, the control unit 21 includes a CA setting unit 211, a CA storage unit 212, and a data communication processing unit 213.

Further, the plurality of transmission antennas, reception antennas, transmission units, and reception units of the terminal device 20 are separately shown for each function. However, in a configuration of an actual terminal device, common units are mounted, if possible. The same applies to the base station device 30 and the following embodiments.

The reception units 22a and 22b of the terminal device 20 may constitute one reception unit and can simultaneously receive a signal of one frequency band. The one frequency band may be divided into and used as a plurality of frequency bands (CCs). In this example, in the downlink of the frequency band f1, the two component carriers DC1 and DC2 are serviced, and the two component carriers are adjacent on a frequency axis or are closely arranged and accordingly received by the same reception unit. In the frequency band f2, the four component carriers DC3, DC4, DC5 and DC6 are serviced, the four CCs are adjacent on the frequency axis or are closely arranged and accordingly received by the same reception unit.

Further, the respective reception units 22a, 22b . . . convert an RF (Radio Frequency) signal received by the reception antennas 23a and 23b into a baseband signal, perform predetermined signal processing for data demodulation to acquire demodulated data for each component carrier, and output the demodulated data to the control unit 21.

Similarly, the transmission units 24a, 24b . . . are configured such that one transmission unit supports one frequency band. In the present embodiment, the component carrier UC1 is serviced in the frequency band f1 and the component carriers UC2 and UC3 are serviced in the frequency band f2. The components carriers are transmitted by the transmission unit 24a and the transmission unit 24b, respectively. Further, the respective transmission units 24a and 24b perform predetermined signal processing on the data for each component carrier received from the control unit 21 for data modulation, convert the signal-processed baseband signal to an RF signal, and perform transmission from the transmission antennas 25a and 25b.

The control unit 21 performs various controls related to communication of the terminal device, such as processing of reception data or transmission data and control of the carrier frequencies of the transmission units and the reception units.

The CA setting unit 211 stores carrier aggregation settings in the CA storage unit 212 according to a request for carrier aggregation settings from the base station device 30. Here, the request for carrier aggregation settings is information indicating component carriers used for communication between the terminal device 20 and the base station device 30 and information indicating the association between the component carrier(s) of the uplink and the component carrier(s) of the downlink, and the CA storage unit 212 stores the information. The data communication processing unit 213 performs data transmission and reception to and from the base station device 30 via the transmission units 24a, 24b . . . and the reception units 22a, 22b . . . according to the carrier aggregation setting stored in the CA storage unit 212.

Further, the base station device 30 includes a plurality of reception antennas 33a, 33b . . . for receiving a signal from the terminal device 20, a plurality of reception units 32a, 32b . . . for demodulating the received reception signal, a plurality of transmission units 34a, 34b . . . for generating data to be transmitted to the terminal device 20, a plurality of transmission antennas 35a, 35b . . . for transmitting transmission data generated by the transmission units 34a, 34b . . . , and a control unit 31 for performing overall control of the base station device 30. The transmission units 34a, 34b ... and the reception units 32a, 32b ... have the same functions as the transmission units 24a, 24b ... and the reception units 22a, 22b ... of the terminal device 20 described above.

However, the transmission units 34a, 34b ... of the base station device 30 include, as channels for transmission to the terminal device 20, a channel for transmission to an individual terminal (e.g., a physical downlink shared channel and a physical downlink control channel of LTE), and a channel for broadcasting to all terminal devices (e.g., a physical broadcast channel of LTE). The reception units 32a, 32b ... of the base station device 30 can simultaneously receive a plurality of data from the terminal device 20 allocated to different channels. The control unit 31 performs various controls related to communication of the base station device 30, such as processing of reception data or transmission data and controls of the carrier frequencies of the transmission units and the reception units. Further, the control unit 31 includes an association candidate storage unit 310, a CA determination unit 311, a CA storage unit 312, and a data communication processing unit 313.

The association candidate storage unit 310 of the control unit 31 stores candidates of association between the component carrier(s) of the downlink and the component carrier(s) of the uplink, and an association number indicating each candidate in advance. For example, the association candidate storage unit 310 stores information indicating that the component carriers DC1 and DC2 of the downlink are associated with the component carrier UC1 of the uplink, as a candidate for association indicated by an association number "1." Further, in this case, the association between the component carriers of the downlink and the uplink component carrier is determined in advance. The CA determination unit 311 selects a candidate to be used for each terminal device 20 from among the candidates for association stored in the association candidate storage unit 310. Accordingly, the CA determination unit 311 selects the component carrier used for the downlink and the component carrier used for the uplink from among a plurality of component carriers (frequency bands), as the component carriers used for communication with the terminal device 20, and selects an association between the component carrier of the downlink and the component carrier of the uplink among the selected component carriers.

Further, the CA determination unit 311 notifies the terminal device 20 of the selected association number as the request for carrier aggregation setting, which is information indicating the component carriers and information indicating the association, using the terminal-specific channel and causes the association number to be stored in the CA storage unit 312.

The data communication processing unit 313 performs data transmission and reception to and from the terminal device 20 via the transmission units 34a, 34b ... and the reception units 32a, 32b ... according to the carrier aggregation settings stored in the CA storage unit 312.

Figure 4:
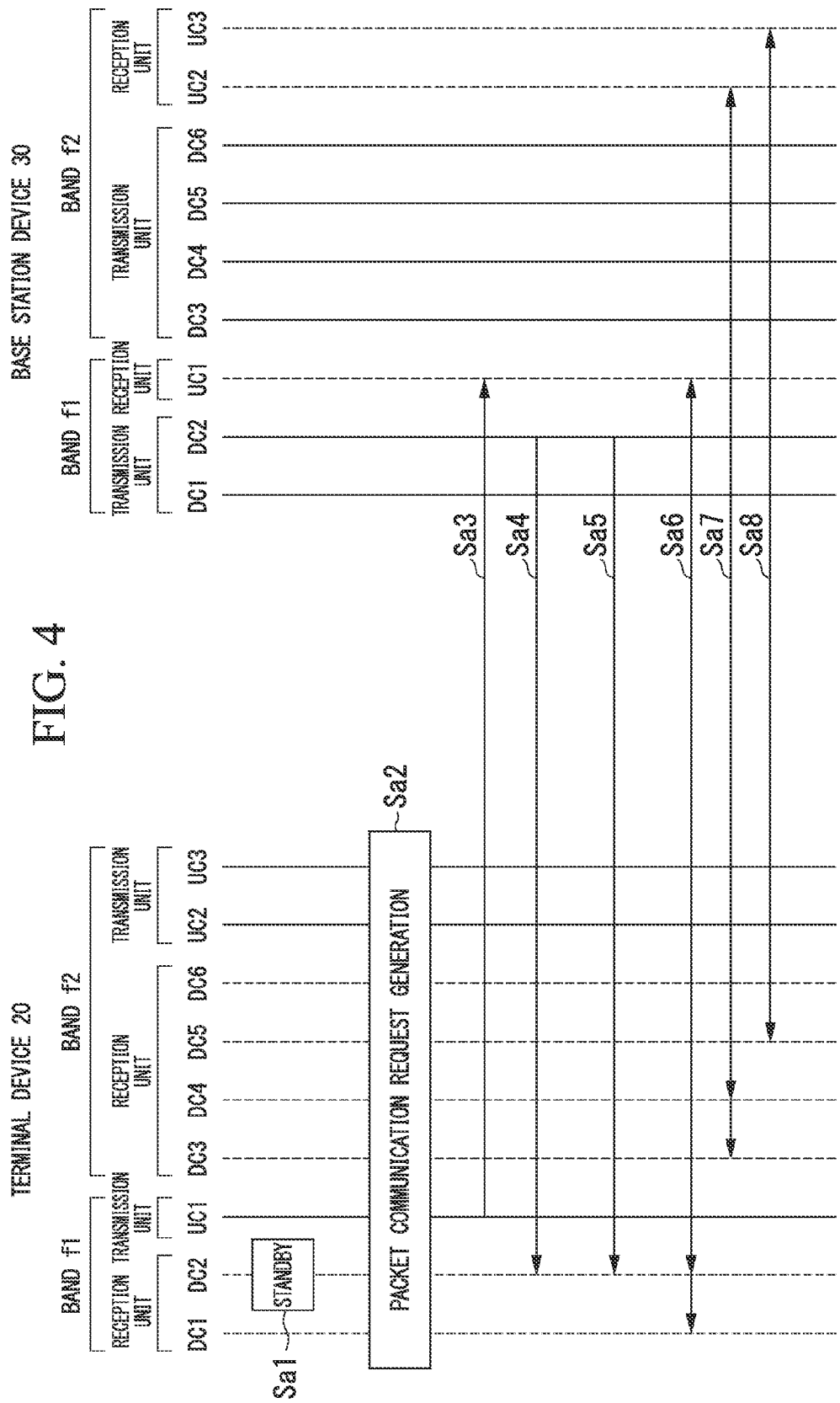
FIG. 4 is a sequence diagram showing a process from a standby state to packet communication establishment in the first embodiment.

FIG. 4 is a sequence diagram showing a process from a standby state to packet communication establishment in the present embodiment. First, the terminal device 20 is in a standby state using the component carrier DC2 of the band f1 (Sa1). That is, the terminal device 20 performs reception frequency setting of the reception unit 22a so that the terminal device 20 can receive the component carrier DC2, starts up only the reception unit 22a for receiving the band f1, and monitors the component carrier DC2. Here, for the terminal device 20, the component carrier DC2 is a component carrier that is a subject of communication determined in advance between the base station device 30 and the terminal device 20, and is a component carrier monitored in the standby state. Hereinafter, this component carrier is referred to as a DL anchor carrier. Further, when quality of the component carrier DC2 is degraded and quality of the component carrier DC4 becomes good in the standby state, the component carrier DC4 may be the DL anchor carrier.

Further, the terminal device 20 has already acquired information indicating which (in this embodiment, the component carrier UC1) of the component carriers of the uplink controls the component carrier DC2, that is, the association between the component carrier of the uplink and the component carrier of the downlink, by receiving, for example, report information broadcast from the base station device 30 to all the terminal devices 20. Further, the component carrier of the uplink controlling the DL anchor carrier is referred to as a UL anchor carrier.

Here, it is assumed that a packet communication request such as a Web access request is generated, for example, by a manipulation of the terminal device 20 by a user while the terminal device 20 is in a standby state using the DL anchor carrier (the component carrier DC2) (Sa2). First, the terminal device 20 transmits a packet connection request signal to the base station device 30 using the UL anchor carrier (the component carrier UC1) (Sa3; packet connection request). After receiving this signal, the base station device 30 transmits a packet connection response signal to the terminal device 20 using the DL anchor carrier (the component carrier DC2) (Sa4; packet connection response).

Next, the CA determination unit 311 selects a candidate used for packet communication with the terminal device 20 from among the candidates for association stored in the association candidate storage unit 310 to determine the component carriers of the uplink and the downlink, and notifies the terminal device 20 of information indicating the selected candidate for association as the request for carrier aggregation settings using the DL anchor carrier (Sa5; carrier aggregation setting request). For example, in the case of an LTE or LTE-A system, the notification is performed using the same channel as a control channel specific to the terminal device 20 performing transmission and reception frequency setting. Here, the candidate for association is represented by identification number information of the component carriers. Also, this identification number information is information indicating the component carrier, but specifically, information that indicates information indicating a frequency for transmission and reception such as a center frequency of the component carrier and information indicating a bandwidth of the component carrier (in the present embodiment, the bandwidth of all component carriers is 20 MHz). Association between the identification number information of the component carrier and the frequency and the bandwidth is held in the terminal device 20 and the base station device 30 in advance.

FIG. 5 is a diagram showing an example of a format of a notification signal for the carrier aggregation setting request described above. The association candidate storage unit 310 also stores candidates for association in the same format. As shown in FIG. 5, the format of the notification signal includes an association number, a DL CC identification number, and a UL CC identification number. For example, the format includes an association number "1," DL CC identification numbers "1" and "2," a UL CC identification number "1" in a first row of FIG. 5, an association number "2," DL CC identification numbers "3" and "4," and a UL CC identification number "2" in a second row, and an association number "3," a DL CC identification number "5," and a UL CC identification number "3" in a third row. The association number is a number for identifying a candidate for association between the component carrier of the uplink and the component carrier of the downlink. The DL CC identification number is an identification number of the component carrier of the downlink constituting the candidate for association identified by the association number. The UL CC identification number is an identification number of the component carrier of the uplink constituting the candidate for association identified by the association number.

Alternatively, actual center frequencies of the component carriers may be directly used in place of the identification numbers. Further, in the request for carrier aggregation settings, there are associations between the downlink and the uplink by the number of described association numbers. That is, in the example of FIG. 5, there are three sets of an association (the association number "1") between the component carriers DC1 and DC2 of the downlink and the component carrier UC1 of the uplink, an association (the association number "2") between the component carriers DC3 and DC4 of the downlink and the component carrier UC2 of the uplink, and an association (the association number "3") between the component carrier DC5 of the downlink and the component carrier UC3 of the uplink.

For example, in the set corresponding to the association number "1" of FIG. 5, the terminal device 20 transmits ACK/NACK information using the uplink component carrier UC1 in response to data transmitted by the base station device 30 using the component carrier DC1 or DC2 of the downlink. That is, closed communication control is performed in the present set. This association may be common in the system, but an association specific to the terminal device may be performed according to a communication state or capability of the terminal device 20. For example, as an association of two sets of the component carriers DC3, DC4 and DC5 of the downlink and the component carriers UC2 and UC3 of the uplink in the band f2, a user of another terminal device 20 may perform communication using association between the component carrier DC3 of the downlink and the component carrier UC2 of the uplink and an association between the component carriers DC4 and DC5 of the downlink and the component carrier UC3 of the uplink, unlike FIG. 5. When such associations specific to the terminal device are performed, all association information in which associations specific to the terminal device are likely to be performed may be stored in the association candidate storage unit 310 and the CA determination unit 311 may select the association from the association candidate storage unit 310. Alternatively, only when the association specific to the terminal device is performed, the CA determination unit 311 may operate to perform any association.

Thus, when communication control is performed using the associations between the uplink and the downlink as in the present embodiment, simple notification of only the component carriers used for communication obstructs recognition of component carriers to be used for communication control. However, it is possible to perform the communication control by transmitting the association information from the base station device 30 to the terminal device 20 using an individual signal, in addition to designation of the component carriers, as in the present embodiment. In the present embodiment, the communication is performed using the five component carriers of the downlink and the three component carriers UC of the uplink. However, when an amount of information transmitted using the uplink is small, it is preferable to transmit the information using a small number of component carrier of the uplink as much as possible in the terminal device 20. In this case, it is also possible to perform the communication using only one component carrier of the uplink in the band f2 by reducing the number of the component carriers by one. For this, it is necessary to change the above-described associations. For example, the communication is performed using an association between the component carriers DC3, DC4 and DC5 of the downlink and the component carrier UC2 of the uplink as the association information of the band f2. It is understood that the association can be performed beyond the band.

FIG. 6 is a diagram showing a first variant of the format of the notification signal for the carrier aggregation setting request. In the format of this variant, sets of the identification number of the component carrier of the downlink and the identification number of the component carrier of the uplink, which are associated with each other, are arranged in order. In the format of this variant, a boundary when moving from the identification number of the uplink to the identification number of the downlink is a boundary of the association sets. For example, in FIG. 6, an identification number "1" of the component carrier of the downlink is arranged next to "DL" indicating a downlink, an identification number "1" of the component carrier of the downlink is arranged next to "DL" indicating a downlink, "UL" indicating an uplink is arranged next to the identification number "2," and an identification number "1" of the component carrier of the uplink is arranged next to "UL."

The above is one associated set. Next "DL" indicating a downlink is arranged, and subsequently, an identification number "3" of the component carrier of the downlink, "DL" indicating a downlink, an identification number "4" of the component carrier of the downlink, "UL" indicating an uplink, and an identification number "2" of the component carrier of the uplink are arranged. This is one associated set. Next, "DL" indicating a downlink, an identification number "5" of the component carrier of the downlink, "UL" indicating an uplink, and an identification number "3" of the component carrier of the uplink are arranged. This makes it unnecessary to notify of the association number as in FIG. 5. Thus, it is possible to reduce a transmitted information amount.

Next, returning to FIG. 4, in sequence Sa5, the base station device 30 notifies the terminal device 20 of the carrier aggregation setting request, that is, the identification number information of the component carrier of the downlink, the identification number information of the component carrier of the uplink, and the association information between the component carrier of the downlink and the component carrier of the uplink in the format of FIG. 5 or 6, as described above. When the carrier aggregation setting request is received, the CA setting unit 211 of the terminal device 20 causes the setting request to be stored in the CA storage unit 212.

Further, the data communication processing unit 213 of the control unit 21 sets carrier frequencies for the transmission units 24a and 24b and the reception units 22a and 22b so that communication using the component carriers notified by the setting request stored in the CA storage unit 212 can be performed. Also, packet communication using the component carriers DC1 and DC2 of the downlink and the component carrier UC1 of the uplink (Sa6; packet communication establishment), packet communication using the component carriers DC3 and DC4 of the downlink and the component carrier UC2 of the uplink (Sa7), and packet communication using the component carrier DC5 of the downlink and the component carrier UC3 of the uplink (Sa8) are established according to the association information in the setting request.

Accordingly, the terminal device 20 can perform high-speed packet communication using the plurality of component carriers.

Next, a second variant of the format of the notification signal for the carrier aggregation setting request will be described. In the present embodiment and the first variant, the example in which the association information is simply transmitted as the request for carrier aggregation settings, in addition to the designation of the component carriers, has been shown. However, if a number is assigned to each candidate that can be associated in advance, and shared between the base station device and the terminal device, only the number assigned in advance may be notified of when the carrier aggregation starts. Here, an example of this will be simply described as the second variant.

First, a number is assigned to a candidate likely to be associated in the mobile communication system 10 and stored in the association candidate storage unit 310 of the base station device 30. FIG. 7 is a diagram showing an example of candidates for association stored in the association candidate storage unit 310. Thus, the component carrier of the downlink and the component carrier of the uplink are associated with one association number, like information of association candidates including an association number "1," a DL CC identification number "1" and a UL CC identification number "1," information of association candidates including an association number "2," a DL CC identification number "2" and a UL CC identification number "1," information of association candidates including an association number "3," a DL CC identification number "3" and a UL CC identification number "2," . . . , and it is stored as association candidate information. Also, all combinations of the component carriers of the uplink and the component carriers of the downlink may be defined and stored in the association candidate storage unit 310.

Prior to the packet communication, the base station device 30 first sends the association candidate information as shown in FIG. 7 to the terminal device 20, for example, using the report information of the mobile communication system 10 in advance. The terminal device 20 receives the association candidate information and causes the association candidate information to be stored in the storage unit included in the control unit 21. Then, when the carrier aggregation is performed, for example, due to generation of the packet communication request, the CA determination unit 311 of the base station device 30 selects a candidate to be used from among the candidates stored in the association candidate storage unit 310 and notifies the terminal device 20 of only the association number of the candidate through individual communication. When the same carrier aggregation as that in FIG. 5 is performed, the association numbers "1," "2," "3," "4" and "7" are notified of. This makes it possible to reduce overhead in the notification.

FIG. 8 is a sequence diagram illustrating a process in which a carrier aggregation combination is changed as communication becomes difficult during high-speed packet communication. Here, a case in which a traffic amount of the component carrier DC5 of the downlink increases while high-speed packet communication is being performed in the packet communication established in sequences Sa6 to Sa8 of FIG. 4 or a case in which the quality is degraded when the terminal device 20 receives the component carrier DC5 will be described as an example in which the carrier aggregation combination is changed as communication becomes difficult during high-speed packet communication. Here, the quality refers to a value indicating ease of demodulation of a reception signal, such as an SNR (Signal to Noise Ratio) or reception power of the reception signal.

The base station device 30 first detects that a traffic amount of the component carrier DC5 has increased. Alternatively, the base station device 30 detects that quality of the component carrier DC5 notified from the terminal device 20 using the component carrier UC3 of the uplink has been degraded (Sa9). On the other hand, the CA determination unit 311 of the base station device 30 re-selects the component carrier used for the communication with the terminal device 20, and notifies of a carrier aggregation setting request based on the selection using the notification component carrier DC5 (Sa10; carrier aggregation setting request). Here, a notification to change a used component carrier from the component carrier DC5 to the component carrier DC6 is performed. Further, a corresponding component carrier of the uplink remains as the component carrier UC3 is and is not changed.

The same format as that in FIG. 5 or 6 described above may be used as a format of a notification signal for the setting request. Further, since all combinations need not be notified of when the signal is notified of as a change notification, the format may be, for example, a format to notify of only a component carrier to be changed and the association information, such as a format consisting of association information to be deleted and association information to be added, may be used. Also, in the example of FIG. 8, the notification is simply performed from the component carrier DC5 in which there was an increase in traffic amount or degradation of quality. However, when the quality of the component carrier DC5 is degraded, the notification may be performed using the DL anchor carrier (the component carrier DC2) to consider a case in which the notification is not made well.

Accordingly, the terminal device 20 maintains the packet communication using a combination between the component carriers DC1 and DC2 of the downlink and the component carrier UC1 of the uplink (Sa11; during the packet communication), and a combination between the component carriers DC3 and DC4 of the downlink and the component carrier UC2 of the uplink (Sa12) as it is. Further, the setting of the reception unit 22b is changed from a state in which the reception unit 22b can receive the component carrier DC5 to a state in which the reception unit 22b can receive the component carrier DC6. Accordingly, packet communication in which communication control is performed using a combination between the component carrier DC6 of the downlink and the component carrier UC3 of the uplink starts (Sa13).

As a method of realizing a receiving process in the terminal device 20, for example, the carrier frequency setting of the reception unit 22b receiving the band f2 is maintained as the band f2 without being changed, and a band filter for the band f2 of the reception unit 22b is adjusted so that the component carrier DC6 of the downlink can be transmitted to thereby receive the component carrier DC6. Further, when the downlink communication uses an OFDM (Orthogonal Frequency Division Multiplex) scheme, the component carrier DC6 may be extracted through an FFT (Fast Fourier Transform) process.

From the above, even in a situation in which communication using a certain component carrier is difficult due to traffic increase or quality degradation when the communication is performed using the carrier aggregation, it is possible to maintain the quality of the packet communication (e.g., an effective rate) by changing the carrier aggregation through a notification of a request for the same carrier aggregation setting (e.g., FIG. 5, the first variant, or the second variant) as that when the carrier aggregation starts.

FIG. 9 is a sequence diagram illustrating a process in which a carrier aggregation combination is changed from high-speed packet communication to low-speed packet communication. Here, a case in which an entire traffic amount of the mobile communication system 10 increases (particularly, the traffic amount of the band f2 increases) while high-speed packet communication being performed in the packet communication established in sequences Sa6 to Sa8 of FIG. 4 or a case in which a communication amount received by the terminal device 20 is small will be described as an example in which a carrier aggregation combination is changed from high-speed packet communication to low-speed packet communication.

The base station device 30 first detects that the traffic amount of the band f2 has increased. Alternatively, the base station device 30 detects that a communication amount directed to the terminal device 20 becomes small (Sa20). On the other hand, the base station device 30 performs a notification of the carrier aggregation setting request using the DL anchor carrier (the component carrier DC2) (Sa21). Here, for example, only information of the association number 1 of FIG. 5 is notified of. When the format of FIG. 6 is used, only the association information of the first half band f1 may be notified of. Alternatively, if the change notification is notified of, only association information to be changed (deleted) may be notified of.

Here, when, for example, the format of FIG. 5 is used only for deletion, a notification for the association number "1" is not necessary, and the identification numbers of the component carriers for the association numbers "2" and "3" may be notified of as blanks. Also, in the example shown in FIG. 9, while the notification is performed using the DL anchor carrier, the notification may be performed using any component carrier of the downlink in the band f2. Accordingly, the terminal device 20 performs the packet communication using only a combination of the component carriers DC1 and DC2 of the downlink and the component carrier UC1 of the uplink (Sa22).

From the above, when the communication amount of the terminal device 20 becomes small, the carrier aggregation change is performed through the notification of the carrier aggregation setting request to reduce the number of used component carriers, making it possible to use communication resources without waste. Also, even in the terminal device 20, when the communication amount is small, only the band f1 may be transmitted and received. Accordingly, it is possible to reduce current consumption by stopping the reception unit 22b or the transmission unit 24b used for transmission and reception of the band f2.

While the carrier aggregation change has been described in FIGS. 8 and 9, the notification of the carrier aggregation setting request when a handover is performed may be similarly performed.

Further, even for the above-described association, it is possible to include detailed association information according to a type of a control signal by causing the association information to be contained in the carrier aggregation setting request for every type of the control signal. For example, association information between the component carrier DC1 of the downlink and the component carrier UC1 of the uplink is set as association information for ACK/NACK information for the uplink and association information between the component carriers DC1 and DC2 of the downlink and the component carrier UC1 of the uplink is set as association information for other control information to notify of the carrier aggregation setting request, such that ACK/NACK information for data of the component carrier UC1 can be notified of only from the component carrier DC1 and other control information for the component carrier UC1 can be notified of from the component carriers DC1 and DC2 of the downlink.

Further, there may be component carriers only for the downlink having no corresponding uplink. In this case, a combination of only the component carriers of the downlink may be considered. However, ACK/NACK information of data when the reception is performed using the CC only for the DL should be notified of using any UC. In this case, association information between the DL data and the UL ACK/NACK may be notified of.

<Second Embodiment>

Figure 10:
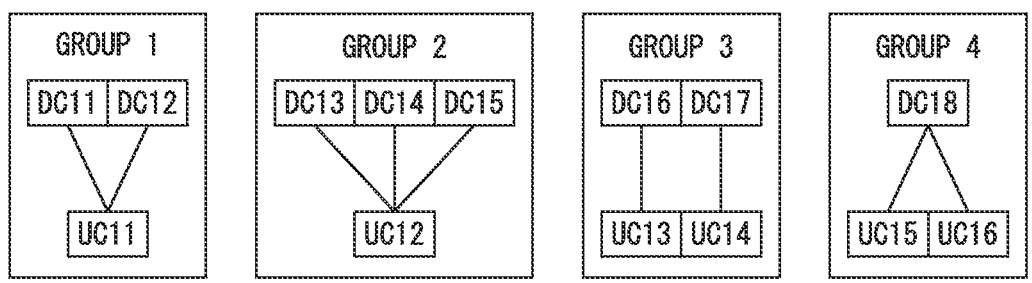
FIG. 10 shows an example in which component carriers having similar propagation characteristics are collected and grouped from among component carriers available in a mobile communication system 10a in a second embodiment of the present invention.

Hereinafter, a second embodiment of the present invention will be described with reference to the accompanying drawings. The mobile communication system 10a in the present embodiment includes a terminal device 20a and a base station device 30a, and the association information in the first embodiment is determined in advance. Further, the association consists of component carriers having similar propagation characteristics, which have been grouped. FIG. 10 shows an example in which component carriers having similar propagation characteristics are collected and grouped from among component carriers available in the mobile communication system 10a in the present embodiment. Further, since the component carriers of the downlink or the component carriers of the uplink in the group are arranged adjacent to each other in terms of a frequency, propagation characteristics are similar. In the example shown in FIG. 10, there are four groups 1 to 4. Group 1 includes component carriers DC11 and DC12 of the downlink and the component carrier UC11 of the uplink. In FIG. 10, the component carrier UC11 is associated with the component carriers DC11 and DC12 so that rectangles indicating the respective component carriers are connected by straight lines.

Similarly, group 2 includes component carriers DC13, DC14 and DC15 of the downlink and a component carrier UC12 of the uplink, and the component carrier UC12 is associated with the component carriers DC13, DC14 and DC15. Group 3 includes component carriers DC16 and DC17 of the downlink and component carriers UC13 and UC14 of the uplink, and the component carrier UC13 is associated with the component carrier DC16 and the component carrier UC14 is associated with the component carrier DC17. Group 4 includes a component carrier DC18 of the downlink and component carriers UC15 and UC16 of the uplink, and the component carrier DC18 is associated with the component carriers UC15 and UC16.

Further, in group 2, the downlink consists of three component carriers and the uplink consists of one component carrier, and accordingly, group 2 is easily used for communication requiring only a downlink capacity, such as Web access. In group 3, the downlink consists of two component carriers and the uplink also consists of two component carriers, and the downlink and the uplink are associated with each other in a one-to-one correspondence relationship, and accordingly, group 3 is easily used for LTE terminal devices. In group 4, the downlink consists of one component carrier and the uplink consists of two component carriers, and accordingly, group 4 is easily used for communication requiring only an uplink capacity.

Figure 11:
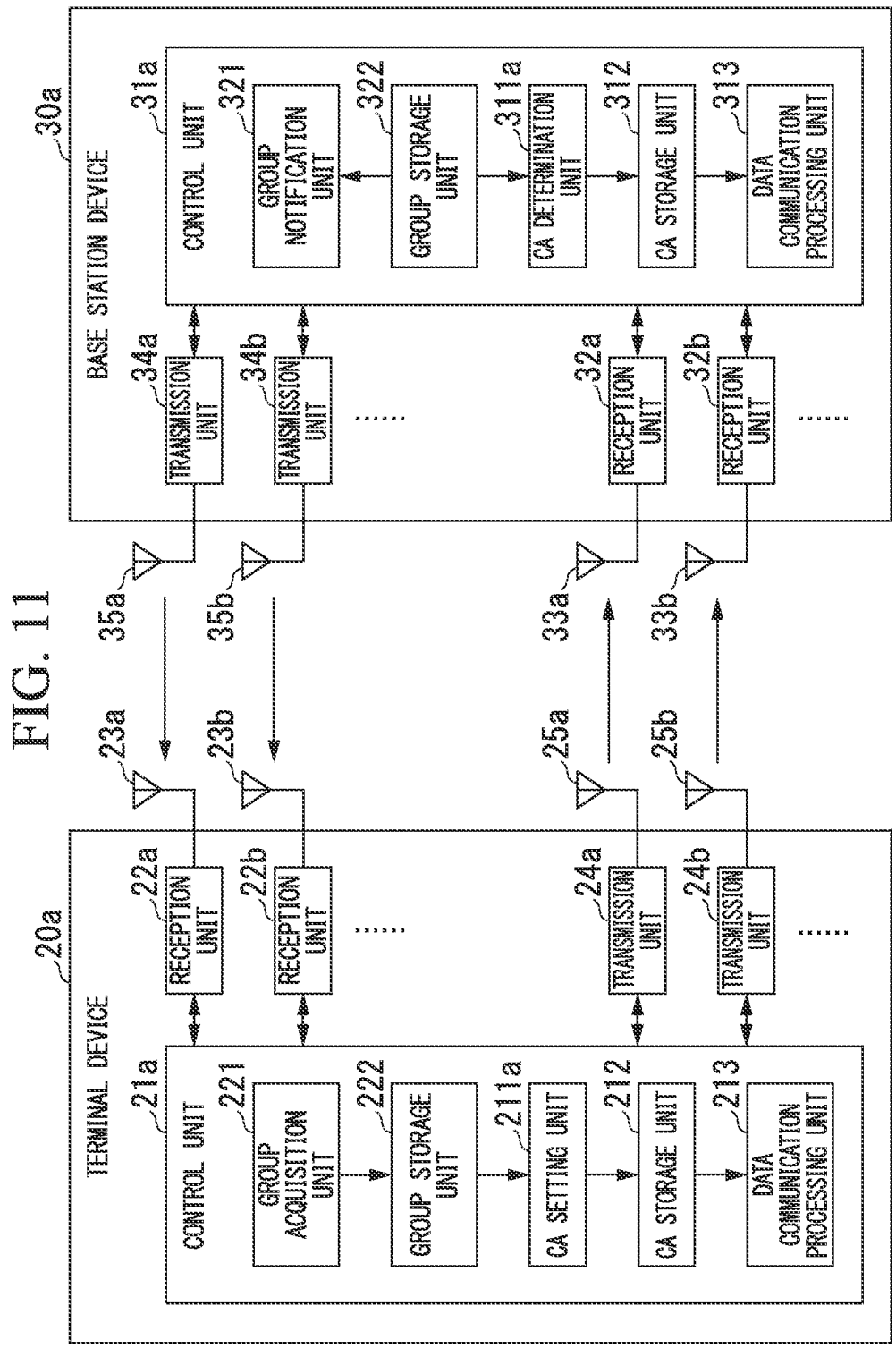
FIG. 11 is a schematic block diagram showing configurations of a terminal device 20a and a base station device 30a in the second embodiment.

FIG. 11 is a schematic block diagram showing configurations of a terminal device 20a and a base station device 30a in the present embodiment. In FIG. 11, the same reference numerals (22a, 22b, 23a, 23b, 24a, 24b, 25a, 25b, 212, 213, 32a, 32b, 33a, 33b, 34a, 34b, 35a, 35b, 312, and 313) are given to units corresponding to those in FIG. 3, and a description of the units will be omitted. The terminal device 20a includes reception antennas 23a, 23b . . . , reception units 22a, 22b . . . , transmission units 24a, 24b . . . , transmission antennas 25a, 25b . . . , and a control unit 21a for performing overall control of the terminal device 20a. The terminal device 20a generally includes various functions such as a display unit and a manipulation unit that are input/output interfaces for a user, which are, however, not shown herein. Further, the control unit 21a includes a group acquisition unit 221, a group storage unit 222, a CA setting unit 211a, a CA storage unit 212, and a data communication processing unit 213. Also, one terminal device 20a is shown in FIG. 11, but the base station device 30a may simultaneously perform wireless communication with a plurality of terminal devices 20a.

The group acquisition unit 221 acquires information indicating a configuration of each group and identification information of the group that any one of the reception units 22a, 22b . . . has received from the base station device 30a, and causes the information to be stored in the group storage unit 222 in advance. Here, the information indicating a configuration of the group contains information indicating component carriers of a downlink constituting the group, information indicating component carriers of an uplink constituting the group, and the information indicating the association between the component carrier of the uplink and the component carrier of the downlink. The group storage unit 222 stores the identification information of the group and the information indicating a configuration of the group in association with each other. The CA setting unit 211a causes the carrier aggregation setting to be stored in the CA storage unit 212 according to the carrier aggregation setting request that any one of the reception units 22a, 22b . . . has received from the base station device 30a. Here, the carrier aggregation setting request in the present embodiment indicates association between a used component carrier and a component carrier used for communication control using the identification information of the group, unlike the first embodiment. The CA setting unit 211a acquires the information indicating the configuration of the group, which has been stored in the group storage unit 222 in association with the identification information of the group, to thereby acquire association between the component carriers constituting the group and the component carriers used for communication control.

The base station device 30a includes reception antennas 33a, 33b . . . , reception units 32a, 32b . . . , transmission units 34a, 34b . . . , transmission antennas 35a, 35b . . . , and a control unit 31a for performing overall control of the base station device 30a. The control unit 31a includes a group notification unit 321, a group storage unit 322, a CA determination unit 311a, a CA storage unit 312, and a data communication processing unit 313. The group notification unit 321 notifies the terminal device 20a of the identification information of each group and the information indicating the configuration of the group stored in the group storage unit 322 using any of the transmission units 34a, 34b . . . in advance. This notification may be transmitted using a terminal-specific channel, for example, when a communication connection is established with the terminal device 20a or may be periodically transmitted using a broadcast channel. When the notification is transmitted using the broadcast channel, the notification may be transmitted using only a prescribed component carrier or may be transmitted using all component carriers of the downlink.

The group storage unit 322 stores the identification information of the group and the information indicating the configuration of the group in association with each other in advance. The CA determination unit 311a selects, for each terminal device 20a, one or multiple groups to be used from among the groups stored in the group storage unit 322 to determine a component carrier used for communication, notifies the terminal device 20a of the request for carrier aggregation setting, which is the selection result, using the terminal-specific channel, and causes the result to be stored in the CA storage unit 312. Further, the identification information of the group and information constituting the group in the present embodiment are notified of from the base station device 30a to the terminal device 20a in advance, but the group storage unit 322 of the base station device 30a and the group storage unit 222 of the terminal device 20a may store the same information in advance. In this case, the group notification unit 321 and the group acquisition unit 221 may not be included.

FIG. 12 is a diagram showing an example of stored content of the group storage unit 322. As shown in FIG. 12, the group storage unit 322 stores a group number, which is the identification information of a group, and an identification number of a component carrier of a downlink and an identification number of a component carrier of an uplink, which are the information indicating the configuration of the group, in association with each other. Also, in the present embodiment, group numbers, which are identification information of groups 1 to 5, are "1" to "5," respectively. Further, identification information of component carriers DC11 to DC18 of the downlink are "1" to "8." The identification information of component carriers UC11 to UC16 of the uplink are "1" to "6."

In the example of FIG. 12, the group number "1," the identification numbers (DL CC identification numbers) "1" and "2" of the component carriers of the downlink, and the identification number (UL CC identification number) "1" of the component carrier of the uplink are stored in association with one another, the group number "2," the DL CC identification numbers "3," "4," and "5" and the UL CC identification number "2" are stored in association with one another, the group number "3," the DL CC identification numbers "6" and "7" and the UL CC identification numbers "3" and "4" are stored in association with one another, and the group number "4," the DL CC identification number "8" and the UL CC identification information "5" and "6" are stored in association with each other.

Figure 13:
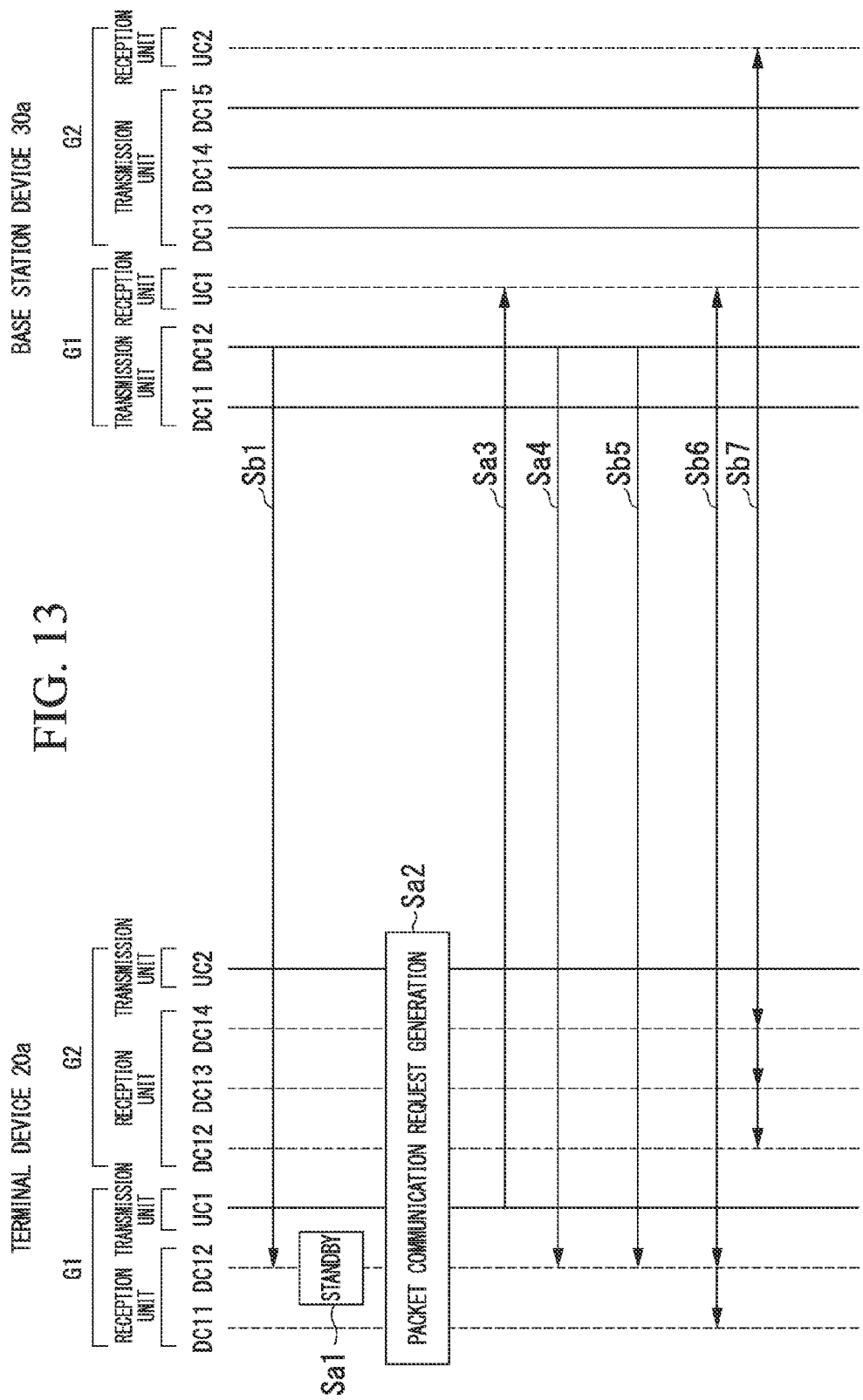
FIG. 13 is a sequence diagram showing a process until high-speed packet communication is established in the second embodiment.

FIG. 13 is a sequence diagram showing a process until high-speed packet communication is established in the mobile communication system 10a. It differs from the first embodiment shown in FIG. 4 in that a notification of a group is transmitted from the base station device 30a in advance (Sb1; a notification of a group), the above-described identification information of the group (designation of group 1 and group 2 in FIG. 10) is used for the carrier aggregation setting request (Sb5; a carrier aggregation setting request), and packet communication has been established using component carriers constituting group 1 (reference numeral G1 in FIG. 13) and group 2 (reference numeral G2 in FIG. 13) according to the carrier aggregation setting request (Sb6 and Sb7). Since other sequences (Sa1 to Sa4) are the same as those in FIG. 4, a description thereof will be omitted. Also, the notification of the group in sequence Sb1 is performed using a system common signal, such as a report signal in cell search, and is received using a first synchronized component carrier of the downlink.

FIG. 14 is a diagram showing an example of content of the carrier aggregation setting request of FIG. 13. In FIG. 14, carrier aggregation performed using group 1 having a group number "1" consisting of component carriers DC11 and DC12 of a downlink having identification numbers "1" and "2" and component carrier UC11 of an uplink having an identification number "1," and group 2 having a group number "2" consisting of component carriers DC13, DC14 and DC15 of the downlink having identification numbers "3," "4" and "5" and the component carrier UC12 of the uplink having an identification number "2" is shown. Also, in such a setting, a carrier aggregation setting request consists of the group numbers "1" and "2," which are identification information of group 1 and group 2.

In the present embodiment, since the component carriers at adjacent frequencies are grouped, the control unit 21a of the terminal device 20a can assign a transmission unit and a reception unit to each group rather than each component carrier to perform transmission and reception. For example, the reception unit 22a and the transmission unit 24a of FIG. 11 are assigned to group 1 and the reception unit 22b and the transmission unit 24b are assigned to group 2 to perform the transmission and the reception.

Thus, the grouping of the component carriers at adjacent frequencies makes it possible to assign a plurality of component carriers to one transmission unit and one reception unit in the terminal device 20a, and is effective to simplify the configuration of the terminal device 20a.

Next, a variant in which the base station device 30a designates a carrier frequency for transmission and reception of each group is shown. FIG. 15 is a diagram showing an example of content of a carrier aggregation setting request in the variant of the present embodiment. Further, a communication sequence showing a process until high-speed packet communication is established in the present variant is the same as that in FIG. 13. A carrier frequency of a downlink and a carrier frequency of an uplink are designated for each group. The designated frequency may be a center frequency of a component carrier group (component carriers are arranged adjacent on a frequency axis), a center frequency of a component carrier at a center, a center frequency of a component carrier at an end, or the like. Alternatively, when component carriers of the uplink and the downlink which are main control targets are present in each group, center frequencies of the component carriers that are main control targets may be designated.

Further, when such a setting is performed, the carrier aggregation setting request consists of the group numbers "1" and "2" that are identification information of group 1 and group 2, a value of a carrier frequency f1DL of the downlink and a value of a carrier frequency f1UL of the uplink in group 1, and a value of a carrier frequency f2DL of the downlink and a value of the carrier frequency f2UL of the uplink in group 2. Further, the group storage unit 322 of the base station device 30a stores information indicating a configuration of each group and carrier frequencies of the downlink and the uplink in each group, and this stored content is used when the CA determination unit 311a generates the carrier aggregation setting request.

FIG. 16 is a diagram showing an example of content stored in the group storage unit 322 of the base station device 30a in the present variant. The group storage unit 322 in the present variant stores a group number, an identification number of a component carrier of a downlink (a DL CC identification number), an identification number of a component carrier of an uplink (UL CC identification number), a downlink carrier frequency (DL frequency), and an uplink carrier frequency (UL frequency) in association with one another, as shown in FIG. 16. For example, the group number "1," the DL CC identification numbers "1" and "2," the UL CC identification number "1," the DL frequency "f1DL," and the UL frequency "f1UL" are stored in association with one another, and the group number "2," the DL CC identification numbers "3," "4" and "5," the UL CC identification number "2," the DL frequency "f2DL," and the UL frequency "f2UL" are stored in association with one another. Here, f1DL, f1UL, f2DL, and f2UL are a value of a center frequency of the downlink of group 1, a value of a center frequency of the uplink of group 1, a value of a center frequency of the downlink of group 2, and a value of a center frequency of the uplink of group 2, respectively.

Further, when the group notification unit 321 performs the notification of the group in sequence Sb1 of FIG. 13, the group notification unit 321 may notify the terminal device 20a of information indicating component carriers of each group and information indicating carrier frequencies of the downlink and the uplink of each group. In this case, in the terminal device 20a having received the notification, the group acquisition unit 221 stores the information in the group storage unit 222 in association with the identification information of the group, and the carrier aggregation setting request consists of only the identification information of the group or only the carrier frequency.

Further, it is preferable to select the carrier frequencies that interfere with each other, if possible. It is also preferable to set transmission and reception frequency intervals between the groups to the same value, if possible. It is also preferable to set association between the uplink and the downlink so that frequencies do not interfere with each other when actually performing transmission and reception, when the association between the uplink and the downlink is performed, in other examples as well as in the present variant. For example, when the association information is notified of, combinations that can be associated in terms of a frequency may be set as association candidates in advance and any of the association candidates may be selected and notified of.

Further, in the present embodiment and its variant, the transmission and reception frequency interval may be limited according to the configurations of the transmission unit and the reception unit of the terminal device 20a or frequencies when the transmission and the reception are actually performed may be limited, such as making frequencies available to the transmission unit and the reception unit different. Alternatively, there may be combinations that cannot be associated in terms of frequency. In this case, the terminal device 20a may select a combination available to the terminal device 20a from among the group candidates stored in the group storage unit 322 in advance and notified of from the base station device 30a in advance, and notify the base station device 30a of it in advance. Alternatively, the terminal device 20a may select the carrier frequency or the carrier frequency interval available to the terminal device 20a from among the carrier frequency or carrier frequency interval candidates determined in advance in the system or notified of from the base station device 30a in advance and notify the base station device 30a of it in advance.

The terminal device information notified of by the terminal device 20a may be contained in information when communication capability of the terminal device (UE Capability in the LTE) is provided to the base station device 30a. Alternatively, the parameter may be determined through a negotiation between the base station device 30a and the terminal device 20a. Even in the first embodiment, the terminal device 20 may notify the base station device 30 of an available association or carrier frequencies.

As shown in the present variant, the base station device 30a sets a carrier frequency for each group such that the terminal device 20a can perform transmission and reception by setting a transmission unit and a reception unit for the notified frequency, particularly, without having to worry about frequency setting, thereby further simplifying the terminal device 20a.

While, in the present embodiment, the group notification unit 321 sends the information indicating the configuration of the group stored in the group storage unit 322 to the terminal device 20a in advance as described above, the CA determination unit 311a may select a group to be used from among the groups stored in the group storage unit 321 and may transmit the information indicating the configuration of the group as the carrier aggregation setting request, as in the first embodiment.

Further, for example, since there are a plurality of component carriers for both the downlink and the uplink in the group number 3 of FIG. 12, a determination is not made as to whether the combination is a combination in which the component carrier having the identification number "1" of the downlink is associated with the component carrier having the identification number "1" of the uplink, and the component carrier having the identification number "2" of the downlink is associated with the component carrier having the identification number "2" of the uplink or a combination in which the component carrier of the identification number "1" of the downlink is associated with the component carrier of the identification number "2" of the uplink, and the component carrier of the identification number "2" of the downlink is associated with the component carrier of the identification number "1" of the uplink, but a rule for association in the group may be determined in advance, such as for a combination between component carriers having small identification numbers or a combination between component carriers at low frequencies. Alternatively, information clearly indicating a specific combination may be contained in the information indicating the configuration of the group.

While the example when the carrier aggregation is performed has been described above, carrier aggregation change or handover can be realized through the same notification as the above-described carrier aggregation setting request, as in the first embodiment. When the notification is performed using only the group number or the carrier frequency, reduction of overhead can be expected.

Further, while grouping has been performed with various associations in the present embodiment, grouping may be performed with the same unified association.

Furthermore, while in the present embodiment, the component carriers in the group have been described as being adjacent to each other, the component carriers need not necessarily be adjacent to each other. Further, it is preferable to limit the number of groups to be simultaneously received, in order to simplify the terminal device.

Figure 17:
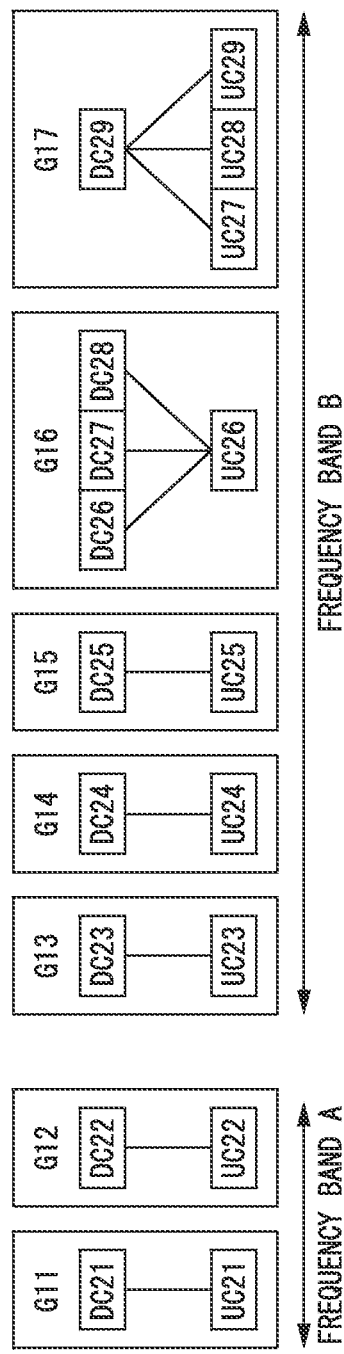
FIG. 17 shows an example in which component carriers available in a mobile communication system 10a are grouped for every association in a variant of the second embodiment.

While the example in which grouping has been performed for each propagation path characteristic has been described above, the grouping may be performed for every association. An example of this case is shown in FIG. 17. Frequency band A is a frequency band used in an existing system (LTE), and there are two groups (groups G11 and G12) of combinations in which a downlink and an uplink are in a one-to-one association. Further, frequency band B is a new extending frequency band with introduction of LTE-A, and there are three groups (groups G13, G14 and G5) of combinations in which a downlink and an uplink are in a one-to-one association, one group (group G6) of an association of three component carriers in the downlink and one component carrier in the uplink, and one group (group G7) of an association of one component carrier in the downlink and three component carriers in the uplink.

Figure 18:
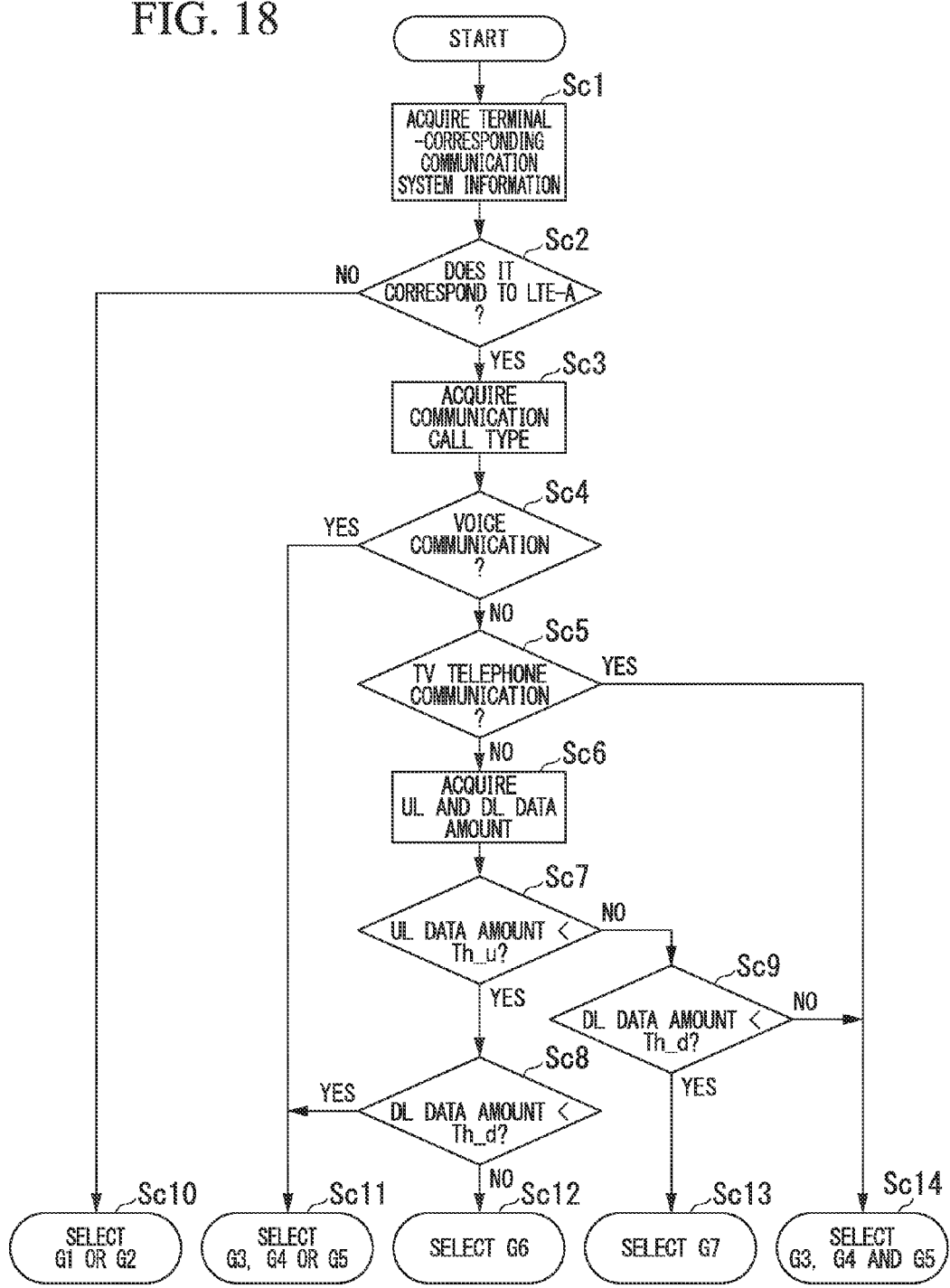
FIG. 18 is a flowchart diagram showing a process in which a group to be used is selected from a group for each association in a variant of the second embodiment.

FIG. 18 is a flowchart diagram showing a process in which a group to be used is selected from a group for each association. The process shown in FIG. 18 is a process in which, when communication between the terminal device 20a corresponding to LTE-A or a terminal device corresponding to only LET and the base station device 30a starts, the CA determination unit 311a of the base station device 30a determines component carriers of an uplink and a downlink for performing carrier aggregation (selects the group). First, the CA determination unit 311a of the base station device 30a acquires terminal-corresponding communication system information indicating whether a communication system to which a terminal device of a communication party corresponds is LTE or LTE-A (Sc1). The present information is acquired from information of terminal device capability since the terminal device notifies the base station device 30a of the terminal device capability when making an initial connection. The CA determination unit 311a determines whether the terminal device of a communication party corresponds to LTE-A based on the acquired terminal-corresponding communication system information (Sc2). If it is determined that the terminal device of the communication party does not correspond to LTE-A (Sc2-No), that is, the terminal device of the communication party is an LTE terminal device, the CA determination unit 311a selects the group G11 or the group G12 assigned to the frequency band A (Sc10). The CA determination unit 311a may select the group having good quality or the group having a small traffic amount from among the groups G11 and G12.

If the terminal device of the communication party is found to correspond to LTE-A as a result of determining whether the terminal device of the communication party corresponds to LTE-A in step Sc2, the CA determination unit 311a then acquires a communication call type (voice communication, TV telephone communication, or data communication) information (Sc3). In order to simplify the description, only three call types will be described herein. If the communication call type is the voice communication (Sc4-Yes), the CA determination unit 311a selects the group G13, G14 or G15 of a new frequency band B (Sc11). The CA determination unit 311a selects one of the groups G13, G14 and G15 based on the quality or the traffic amount, as described above. In the voice communication, one component carrier is sufficient for both the downlink and the uplink. Thus, it is possible to perform communication using the group G13, G14 or G15 in which the downlink and the uplink are in a one-to-one correspondence relationship, to effectively utilize resources, and to reduce current consumption of the terminal device 20a.

Further, if the communication call type is the TV telephone communication (Sc5-Yes), the CA determination unit 311a selects all the groups G13, G14 and G15 of the new frequency band B (Sc14). Use of the three groups makes bidirectional large-capacity stream communication such as TV telephone communication possible.

Further, if the communication call type is neither the voice communication nor the TV telephone communication (Sc5-No), that is, if the communication call type is the data communication, the CA determination unit 311 a acquires data amounts of the uplink and the downlink (Sc6) and selects the group based on the data amounts.

First, when the uplink and downlink data amounts are small (Sc7-Yes and Sc8-Yes), the CA determination unit 311a selects G13, G14 or G15 of the new frequency band, as in the voice communication (Sell). Here, if the uplink data amount is small, it means that the uplink data amount is equal to or less than a data amount (Th_u) sufficient for communication using only one component carrier (Sc7-Yes). If the downlink data amount is small, it means that the downlink data amount is equal to or less than a data amount (Th_d) sufficient for communication using only one component carrier (Sc8-Yes).

Further, when the data amounts of the uplink and the downlink are great (Sc9-No), communication is performed using all the groups G13, G14 and G15 of the new frequency band B, as in the TV telephone communication (Sc14). When only the data amount of the uplink is small (Sc7-Yes, Sc8-No), the group G16 of the new frequency band B is selected (Sc12). When only the data amount of the downlink is small (Sc7-No, Sc9-Yes), the group G17 of the new frequency band B is selected (Sc13). Thus, since component carriers of the number according to data amounts of the uplink and the downlink can be selected, it is possible to effectively utilize radio resources and to reduce current consumption of the terminal device 20a.

Here, each of associations such as the groups G16 and G17 includes only one group, but it is understood that there may be a plurality of groups, and in this case, any of the groups is selected based on the quality or the traffic amount, as described above. Further, in the present embodiment, the LTE-A terminal device 20a does not use the existing frequency band A, but when the communication call type is the voice communication (Sc4-Yes) or when the communication capacity is small (Sc8-Yes), the group G11 or G12 of the existing frequency band A may be selected in step Sc11.

Further, while, in the present embodiment, the group is selected based on the communication system information, the communication call type information, and the uplink and downlink data amount, group selection may be performed using only one or two of the information.

<Third Embodiment>

In the second embodiment, the associations between the uplink and the downlink are determined in the system in advance and combined to determine a set of component carriers for the carrier aggregation. On the other hand, in a third embodiment, a set of component carriers for the carrier aggregation (including the associations) is determined as a CA pattern by the system in advance.

Figure 19:
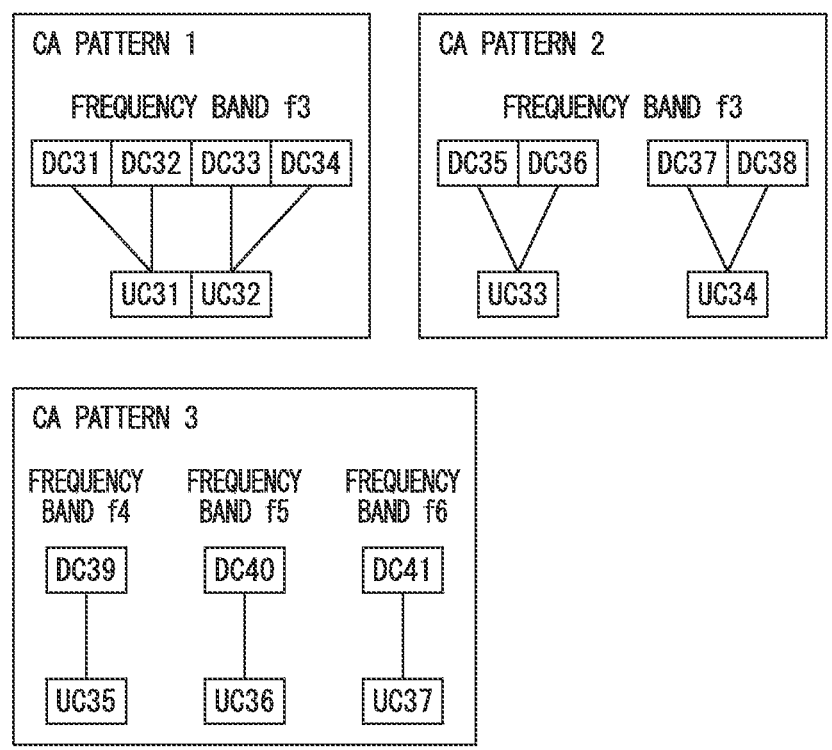
FIG. 19 is a conceptual diagram showing an example of CA patterns in a third embodiment of the present invention.

FIG. 19 is a conceptual diagram showing an example of the CA patterns in the present embodiment. In the present embodiment, a frequency band f3 is a frequency band in which a wide frequency band can be secured. Frequency bands f4 to f6, particularly, the frequency bands f5 and f6, are frequency bands in which a frequency band is difficult to secure. The frequency band in which a frequency band is difficult to secure includes, for example, a frequency band used in an existing mobile communication system. CA pattern 1 is a pattern in which component carriers of a downlink and an uplink are arranged adjacent on a frequency axis. That is, CA pattern 1 includes component carriers DC31 to 34 of a downlink and component carriers UC31 and 32 of an uplink, in which the component carriers DC31 and DC32 are associated with the component carrier UC31, and the component carriers DC33 and DC34 are associated with component carrier UC32. In the present embodiment, a service example of CA pattern 1 includes a service using the frequency band f3 in which a wide frequency band can be secured. Also, a bandwidth of each component carrier is 20 MHz. Because of this, 80 MHz of the downlink and 40 MHz of the uplink are simultaneously available.

CA pattern 2 is a pattern in which component carrier groups are divided into two sets and arranged on the frequency axis. That is, CA pattern 2 includes a set in which component carriers DC35 and DC36 of a downlink are associated with a component carrier UC33 of an uplink, and a set in which component carriers DC37 and DC38 of the downlink are associated with a component carrier UC34 of the uplink. However, the component carriers in each set are adjacent on the frequency axis. In the present embodiment, a service example of CA pattern 2 includes service using the frequency band f3 in which a wide frequency band can be secured, as in CA pattern 1. Also, a bandwidth of each component carrier is 20 MHz, as in CA pattern 1. Because of this, 80 MHz of the downlink and 40 MHz of the uplink are simultaneously available, as in CA pattern 1.

CA pattern 3 is a pattern in which component carriers are divided for frequency bands on a frequency axis. That is, in a frequency band f3 of CA pattern 3, a component carrier DC39 of a downlink is associated with a component carrier DC35 of an uplink. In a frequency band f4, a component carrier DC40 of the downlink is associated with a component carrier UC36 of the uplink. In a frequency band f5, a component carrier DC41 of the downlink is associated with a component carrier UC37 of the uplink. In the present embodiment, as a service example of the CA pattern 3, a bandwidth of the component carriers of the frequency band f4 is 20 MHz and a bandwidth of the component carriers of the frequency bands f5 and f6 is 10 MHz. Because of this, 40 MHz of the downlink and 40 MHz of uplink are simultaneously available.

The mobile communication system 10b in the present embodiment includes a terminal device 20b and a base station device 30b, and corresponds to the three patterns of FIG. 19. That is, since available carrier aggregation in the mobile communication system 10b is limited to the three types (a use frequency and a bandwidth are also limited in the system), a notification (broadcasting) of only the corresponding CA pattern in the system as system information makes the carrier aggregation in the terminal device 20b possible.

Figure 20:
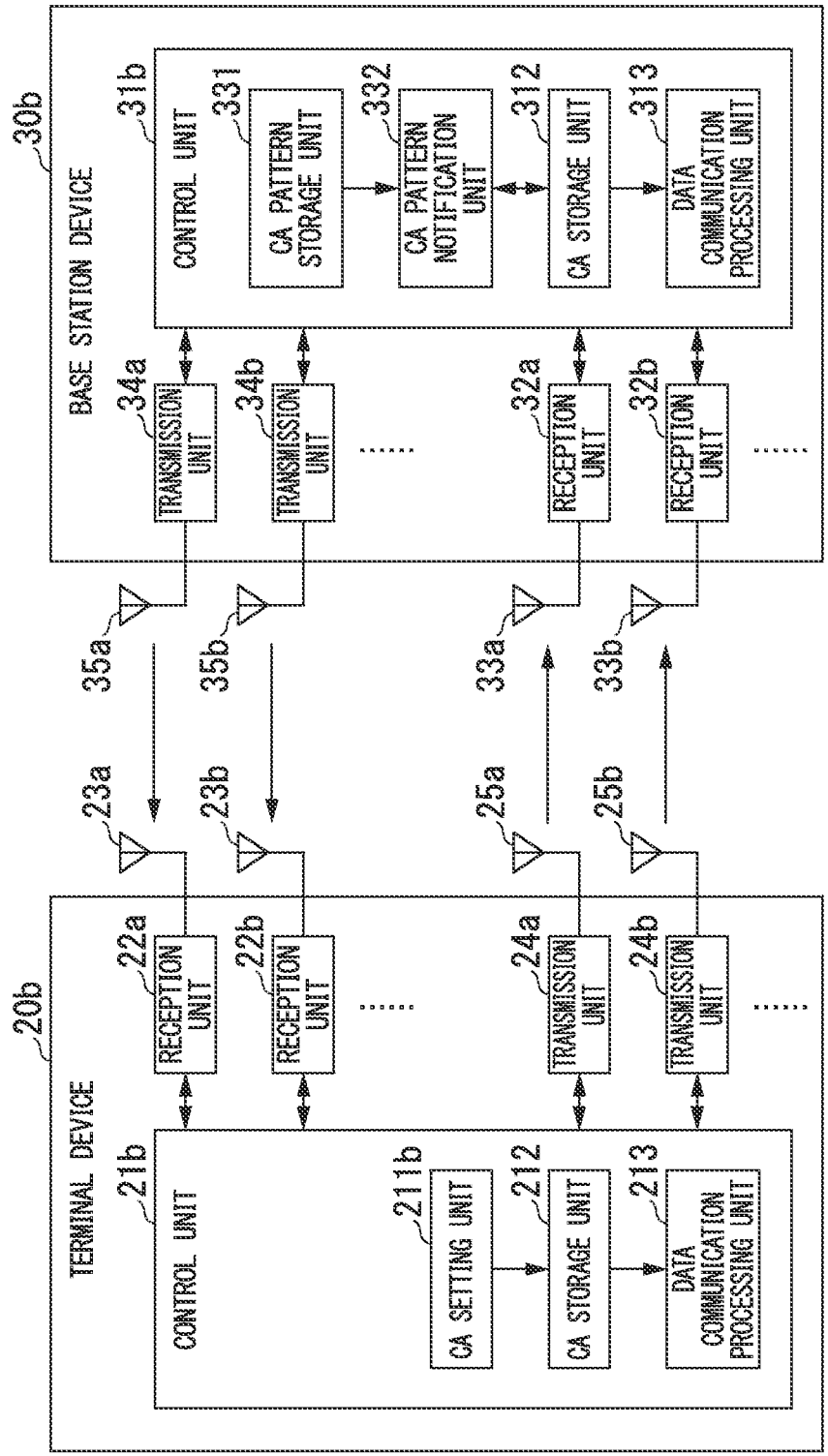
FIG. 20 is a schematic block diagram showing configurations of a terminal device 20b and a base station device 30b in the third embodiment.

FIG. 20 is a schematic block diagram showing configurations of the terminal device 20b and the base station device 30b in the present embodiment. In FIG. 20, the same reference numerals are given to units corresponding to those in FIG. 3 and a description of the units will be omitted. The terminal device 20b includes a control unit 21B, reception units 22a, 22b . . . , reception antennas 23a, 23b . . . , transmission units 24a, 24b . . . , and transmission antennas 25a, 25b . . . The control unit 21B includes a CA setting unit 211b, a CA storage unit 212, and a data communication processing unit 213. The base station device 30b includes a control unit 31b, reception units 32a, 32b . . . , reception antennas 33a, 33b . . . , transmission units 34a, 34b . . . , and transmission antennas 35a, 35b . . . The control unit 31b includes a CA pattern storage unit 331, a CA pattern notification unit 332, a CA storage unit 312, and a data communication processing unit 313. While only one terminal device 20b is shown in FIG. 20, the base station device 30b may simultaneously perform wireless communication with a plurality of terminal devices 20b.

The CA pattern storage unit 331 of the base station device 30b stores pattern numbers for identifying CA patterns 1 to 3 described above, and pattern information indicating configurations of the CA patterns having the pattern numbers in advance. The CA pattern notification unit 332 broadcasts the pattern numbers of the CA patterns and the pattern information of the pattern numbers stored in the CA pattern storage unit 331 and the pattern number of the CA pattern currently used for carrier aggregation stored in the CA storage unit 312 using the respective transmission units 34a, 34b . . . , as report information of each component carrier. Also, the broadcasting of the report information may be performed using only some component carriers rather than all the component carriers. If synchronization is made in any frequency band after cell search, the CA setting unit 211b of the terminal device 20b receives the report information broadcast by the CA pattern notification unit 332 via a reception unit in which the carrier frequency has been set in the frequency band. Also, the CA setting unit 211b acquires a currently used CA pattern from the received report information and causes the pattern information of the CA pattern to be stored in the CA storage unit 212.

Figure 21:
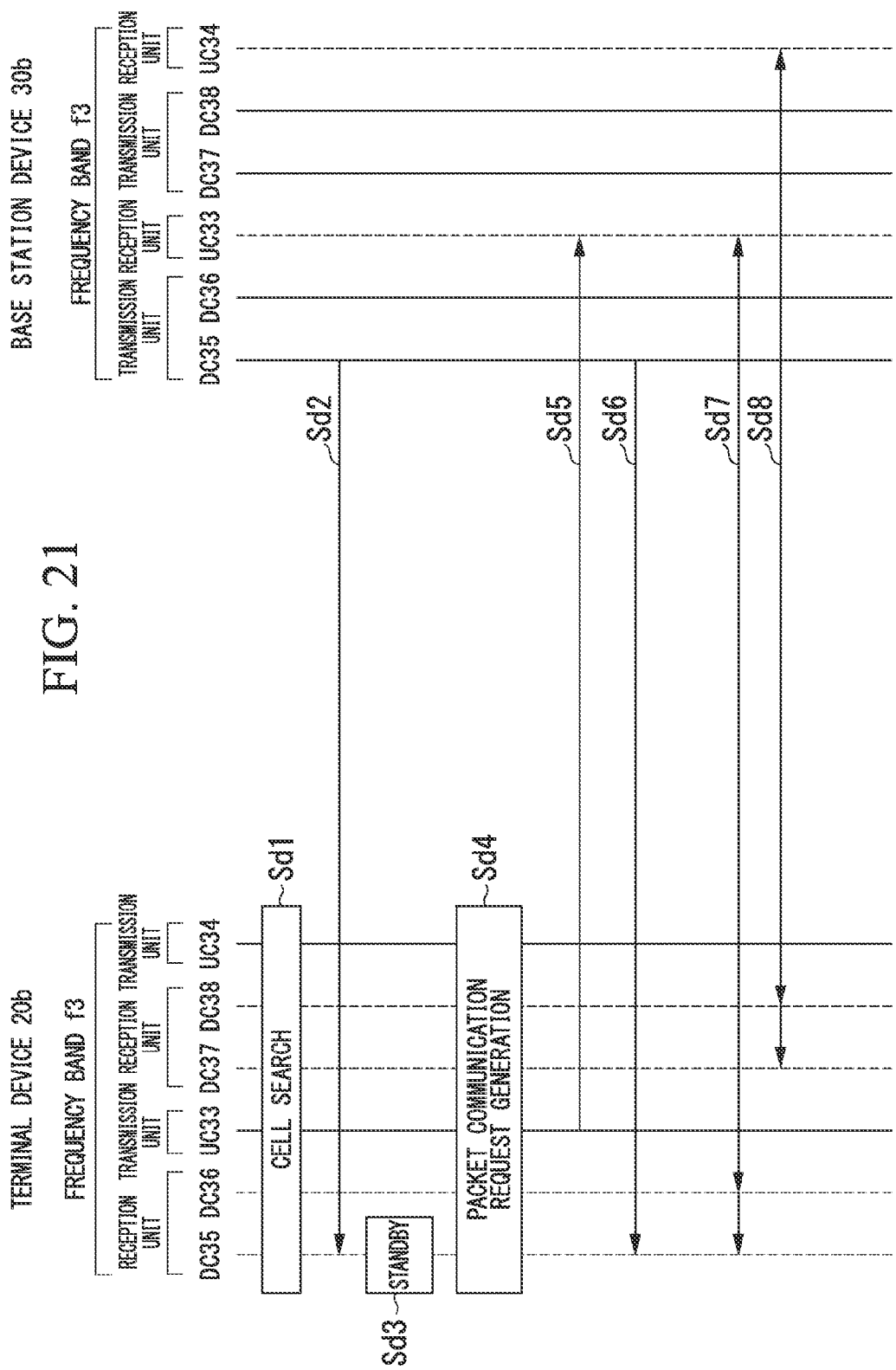
FIG. 21 is a communication sequence diagram in which high-speed packet communication is performed from cell search in the third embodiment.

FIG. 21 is a communication sequence diagram in which high-speed packet communication is performed from cell search in the present embodiment. However, only component carriers related to the communication are described. First, the terminal device 20b performs the cell search (Sd1) to receive a first synchronized component carrier DC35 of a downlink in a frequency band f3. In this case, the CA setting unit 211b receives system common report information containing pattern information generated by the CA pattern notification unit 332 of the base station device 30b from the component carrier DC35 (Sd2; pattern information notification) and acquires the pattern number of the corresponding (serviced) CA pattern in the system and the pattern information (herein, information of the three patterns to which the base station device 30b corresponds), and a currently used pattern number.

Further, when the system corresponds to only one CA pattern, only information of the CA pattern may be notified of, and the information indicating a currently used pattern may not be transmitted. Here, when the pattern number and the pattern information of the CA pattern having the pattern number are stored in the base station device 30b and the terminal device 20b in advance, the CA pattern notification unit 332 may not transmit the pattern information.

Herein, the CA setting unit 211b is assumed to have acquired the pattern number of CA pattern 2 as the currently used pattern. Then, the CA setting unit 211b enters a standby state (a state in which it is camped on DC35) (Sd3). However, a sequence not related to the present invention, such as position registration after the cell search, is omitted.

When a packet communication request is generated in the standby state (when it is camped on DC35) (Sd4), first, communication connection with the component carrier UC33 in the frequency band f3, which is the component carrier of the uplink, associated with the component carrier DC35 of the downlink in the frequency band f3 is established using a conventional method (e.g., a communication connection method in existing LTE). Then, the data communication processing unit 213 transmits a packet connection request signal to the base station device 30b using the component carrier UC33 by referencing the pattern information stored in the CA storage unit 212 (Sd5; packet connection request).

When the data communication processing unit 313 of the base station device 30b receives this packet connection request signal, the data communication processing unit 313 transmits a packet connection response signal as a response using the component carrier DC35 associated with the component carrier UC33 (Sd6; packet connection response). The terminal device 20b performs carrier aggregation of CA pattern 2 stored in the CA storage unit 212 to establish packet communication using a set of the component carriers DC35 and DC36 of the downlink and the component carrier UC33 of the uplink (Sd7; packet communication establishment) and a set of the component carriers DC37 and DC38 of the downlink and the component carrier UC34 of the uplink (Sd8). Thus, it is possible to establish high-speed packet communication using the plurality of component carriers.

Further, the system corresponds to the plurality of CA patterns as described above, and when the CA pattern is switched, the communication can be performed by notifying of the pattern number using an individual control signal and switching the carrier aggregation. Also, when a CA pattern change is performed in the handover, the present pattern information may be contained in a notification parameter in the handover. It is understood that only a pattern number may be used when the pattern information is defined by numbering by the system in advance.

Further, when the CA pattern is uniquely determined corresponding to the component carrier of the downlink received by the terminal device 20b and if only a component carrier of a downlink of a handover destination is notified of as in related art in handover, the CA pattern can be uniquely determined Thus, it is unnecessary to notify of the pattern information.

From the above, it is possible to greatly reduce overhead necessary for communication by defining the CA pattern in the system.

<Fourth Embodiment>

Figure 22:
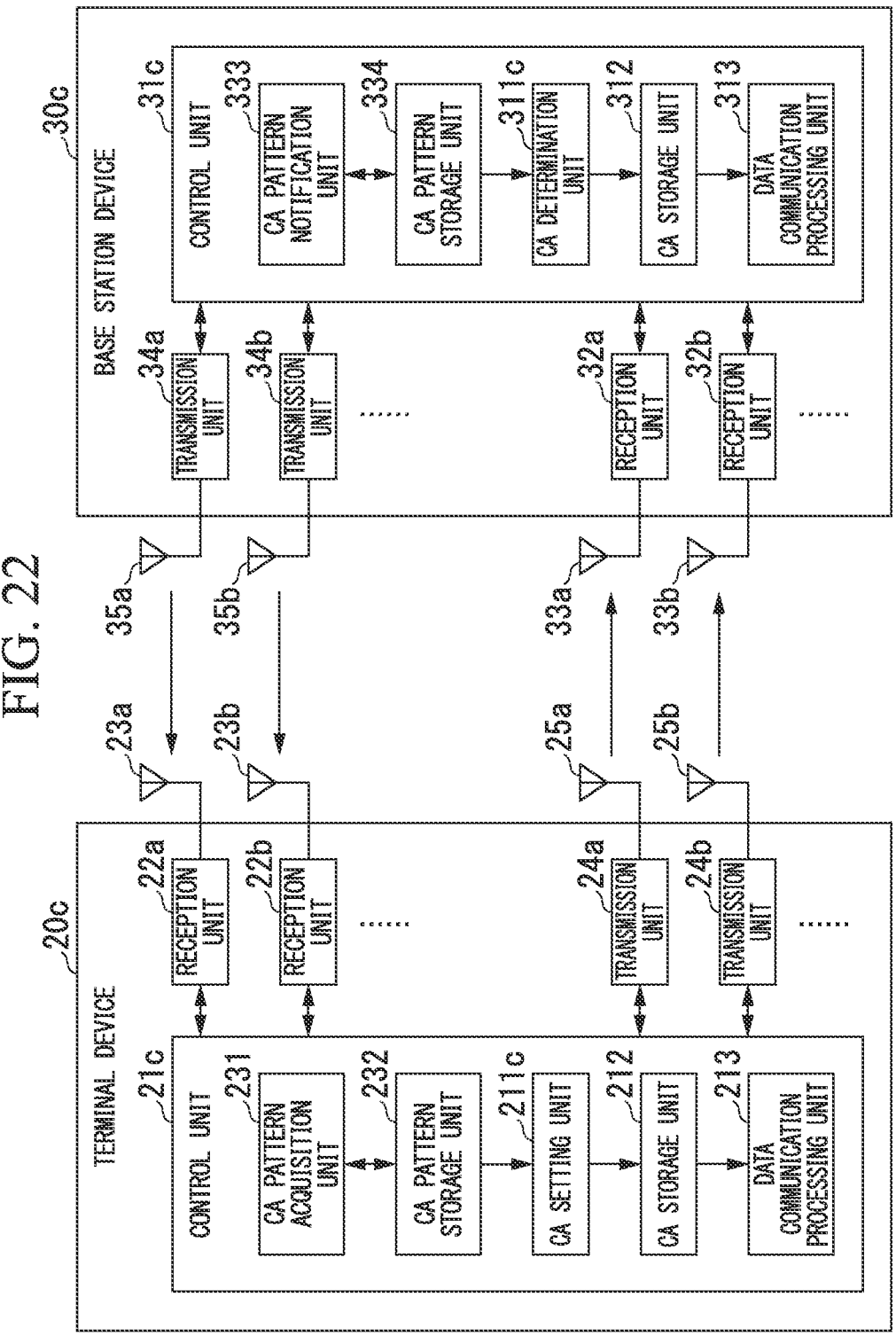
FIG. 22 is a schematic block diagram showing configurations of a terminal device 20c and a base station device 30c in the fourth embodiment of the present invention.

Hereinafter, a fourth embodiment of the present invention will be described with reference to the accompanying drawings. Even in the present embodiment, the CA pattern as shown in FIG. 19 is used, as in the third embodiment. A mobile communication system 10c in the present embodiment includes a terminal device 20c and a base station device 30c. FIG. 22 is a schematic block diagram showing configurations of the terminal device 20c and the base station device 30c in the present embodiment. In FIG. 22, the same reference numerals are given to units corresponding to those in FIG. 3 and a description of the units will be omitted.

The terminal device 20c includes a control unit 21c, reception units 22a, 22b . . . , reception antennas 23a, 23b . . . , transmission units 24a, 24b . . . , and transmission antennas 25a, 25b . . . The control unit 21c includes a CA pattern acquisition unit 231, a CA pattern storage unit 232, a CA setting unit 211c, a CA storage unit 212, and a data communication processing unit 213. The base station device 30c includes a control unit 31c, reception units 32a, 32b . . . , reception antennas 33a, 33b . . . , transmission units 34a, 34b . . . , and transmission antennas 35a, 35b . . . The control unit 31c includes a CA pattern notification unit 333, a CA pattern storage unit 334, a CA determination unit 311c, a CA storage unit 312, and a data communication processing unit 313. Further, while one terminal device 20c is shown in FIG. 22, the base station device 30c can simultaneously perform wireless communication with a plurality of terminal devices 20c.

The CA pattern notification unit 333 of the base station device 30c broadcasts a pattern number of a CA pattern and pattern information of the pattern number stored in the CA pattern storage unit 334, as report information of each component carrier, using the respective transmission units 34a, 34b . . . Also, the CA pattern notification unit 333 receives the pattern number of the CA pattern available to the terminal device 20c from the terminal device 20c via any of the reception units 32a, 32b . . . , and causes the reception result to be stored in the CA pattern storage unit 334.

The CA pattern storage unit 334 stores a pattern number of a CA pattern available to the base station device 30c and pattern information of the pattern number in advance. Further, the CA pattern storage unit 334 stores the CA pattern available to the terminal device 20c received by the CA pattern notification unit 333 in association with the identification information of the terminal device 20c. The CA determination unit 311c selects a CA pattern to be used from among the CA patterns available to the terminal device 20c stored in the CA pattern storage unit 334, and notifies the terminal device 20c of the pattern number of the CA pattern as the carrier aggregation setting request. Also, the CA determination unit 311c causes the pattern information of the selected CA pattern to be stored in the CA storage unit 312.

The CA pattern acquisition unit 231 of the terminal device 20c receives the pattern number and the pattern information of the pattern number broadcast by the base station device 30c, via any one of the reception units 22a, 22b . . . , and causes the reception result to be stored in the CA pattern storage unit 232. The CA pattern acquisition unit 231 transmits a pattern number of the pattern information available to the terminal device 20c among the received pattern information to the base station device 30c. For this transmission, a prescribed one of the transmission units 24a, 24b . . . may be used or a transmission unit in which a frequency band associated by the received pattern information is assigned to a frequency band of the reception unit having received the pattern number and the pattern information may be used. Further, the CA pattern acquisition unit 231 determines whether the received pattern information is available in the terminal device 20c based on whether the reception units 22a, 22b . . . and transmission units 24a, 24b . . . of the terminal device 20c are using only available frequency bands in the pattern information.

The CA pattern storage unit 232 stores the pattern number of the CA pattern and the pattern information of the pattern number received by the CA pattern acquisition unit 231.

The CA setting unit 211c receives the carrier aggregation setting request, which is received from the base station device 30c, via any one of the reception units 22a, 22b . . . , reads pattern information of the pattern number designated by the setting request from the CA pattern storage unit 232, and causes pattern information to be stored in the CA storage unit 212.

Figure 23:
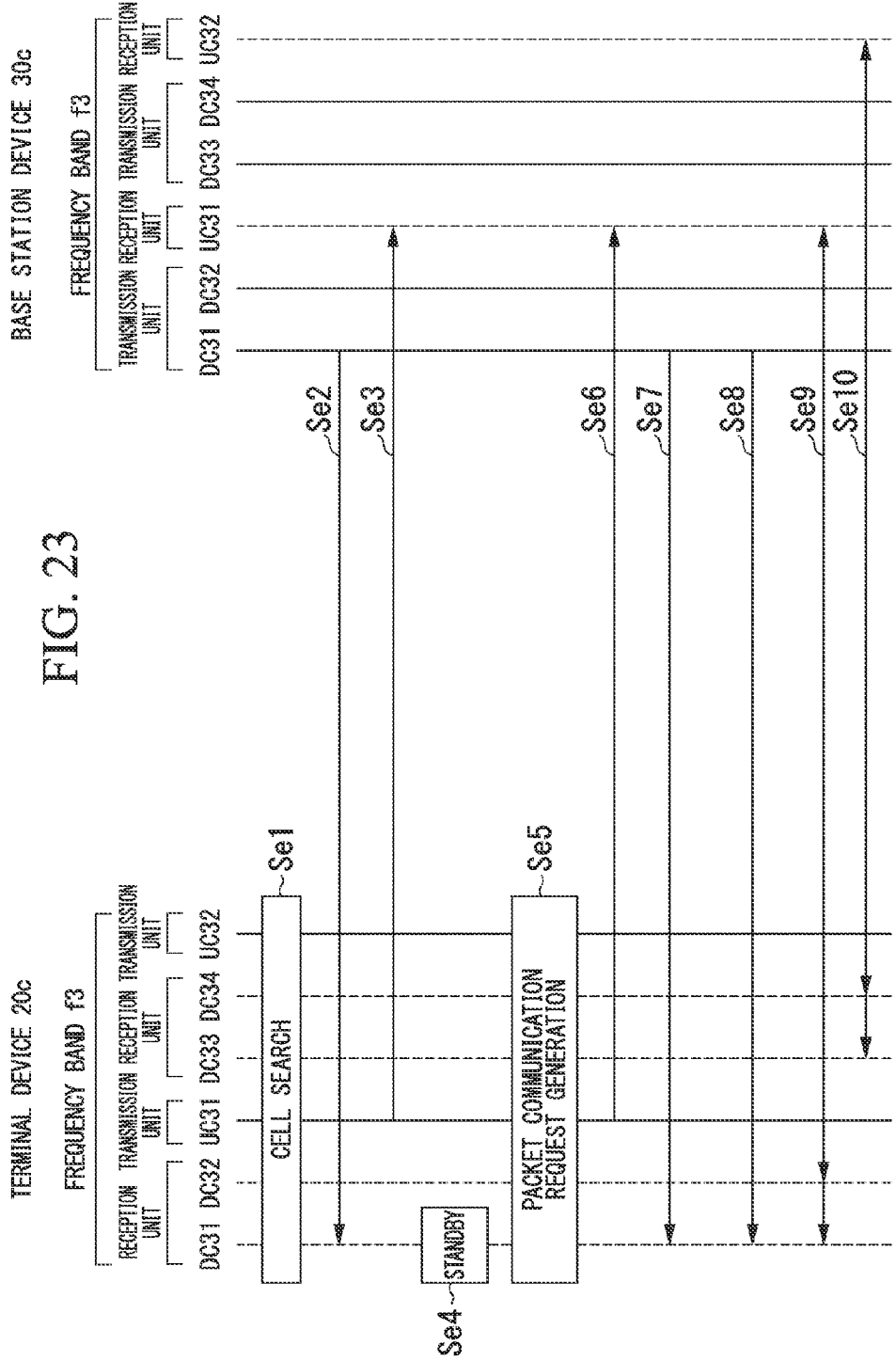
FIG. 23 is a communication sequence diagram when high-speed packet communication is performed from cell search in the fourth embodiment.

FIG. 23 is a communication sequence diagram when high-speed packet communication is performed from cell search in the present embodiment. However, only carrier components related to communication are shown in FIG. 23. First, the terminal device 20c performs the cell search using the reception unit 22a (Se1) to receive a first synchronized component carrier DC31 of a downlink in a frequency band f3. In this case, the terminal device 20c receives system common report information from the component carrier DC31, and the CA pattern acquisition unit 231 acquires a pattern number of a CA pattern that can be serviced in the system and the pattern information of the pattern number from the report information (Se2; pattern information). Here, the mobile communication system 10c is assumed to correspond to the three patterns shown in FIG. 19. Further, while the terminal device 20c is described as performing the cell search using the reception unit 22a, the terminal device 20c may use a reception unit other than the reception unit 22a. Alternatively, the reception unit may be changed with a frequency for the cell search.

Next, the CA pattern acquisition unit 231 of the terminal device 20c selects one or multiple patterns available to the terminal device 20c from among the corresponding pattern information acquired from the report information and notifies the base station device 30c of the patterns using a component carrier UC31 in the frequency band f3, which is a component carrier of an uplink associated with the component carrier DC31, via the transmission unit corresponding to the component carrier. Here, the terminal device 20c corresponds to the frequency bands f3 and f4, selects available CA patterns 1 and 2 using only the two frequency bands, and reports pattern numbers of CA patterns 1 and 2 to the base station device 30c as terminal-available CA pattern notification (Se3; terminal-available CA pattern notification). After receiving this notification, the CA pattern notification unit 333 of the base station device 30c causes the pattern number designated by the notification to be stored in the CA pattern storage unit 334. Then, the terminal device 20c enters a standby state (Se4).

However, sequences not related to the present invention, such as position registration following the cell search, are omitted.

When a packet communication request is generated in the terminal device 20c in the standby state (Se5), the data communication processing unit 213 of the terminal device 20c transmits the packet connection request signal to the base station device 30c using the component carrier UC31 of the uplink in the frequency band f3 via the transmission unit corresponding to the component carrier (Se6; packet connection request). The data communication processing unit 313 of the base station device 30c transmits a packet connection response signal from DC31 in the frequency band f3 (Se7; packet connection response). Next, the CA determination unit 311c of the base station device 30c determines a CA pattern to be used in consideration of the CA pattern available to the terminal device 20c notified in sequence Se3 and stored in the CA pattern storage unit 334, and notifies of a pattern number of the CA pattern or a carrier transmission and reception frequency as the carrier aggregation setting request (Se8; carrier aggregation setting request). The CA setting unit 211c of the terminal device 20c performs carrier aggregation based on an individually notified carrier aggregation setting request, and an association indicated by the pattern information notified using the report information in advance. Accordingly, high-speed packet communication is established (Se9 and Se10).

In sequence Se8, since the terminal device 20c does not correspond to CA pattern 3, the CA determination unit 311c selects CA pattern 1 or 2 and notifies of the pattern number of CA pattern 1 or 2 as the carrier aggregation setting request or notifies of a carrier transmission and reception frequency according to the selected CA pattern as the carrier aggregation setting request. Here, since the terminal device 20c is notified of information of the association between the uplink and the downlink using the pattern information contained in the report information in advance, if only the information indicating the carrier transmission and reception frequency is notified of, the CA setting unit 211c of the terminal device 20c can specify the CA pattern. Further, when the CA pattern is used, the carrier transmission and reception frequency is a radio frequency to be set in any transmission unit and reception unit, and may be a center frequency of a component carrier of an uplink or a downlink in the same frequency band constituting the CA pattern or may be a center frequency of any component carrier. It is understood that information of a bandwidth of each component carrier is necessary, as described above.

However, while the association is also determined in advance in the present embodiment, the association information is simultaneously notified of individually in sequence Se8, for example, in a case in which one component carrier of the uplink and four component carriers of the downlink are desired to be used, when the terminal device 20c desires to individually control the association information, that is, when the terminal device 20c in the mobile communication system 10c individually changes the association between the uplink and the downlink.

From the above, the notification of the information indicating the CA pattern available to the terminal device 20c in sequence Se3 makes communication according to configurations of the transmission units and reception units of the terminal device 20c possible.

Further, as in the first to third embodiments, the available association or the carrier aggregation setting request may be notified of between the terminal device 20c and the base station device 30c using the group number, the carrier frequency or the association number rather than the pattern number of the CA pattern.

In the present embodiment, the examples described in the second embodiment may be used in a combined form. That is, if the pattern used in the present system is determined, the notification method described in the second embodiment may be used using grouping according to the pattern.

<Fifth Embodiment>

The first to fourth embodiments described above are examples when the carrier aggregation is performed. For example, in an LTE system, communication is performed using the component carriers of the uplink and the component carriers of the downlink that are in a one-to-one correspondence relationship. An example in which, in such a system, only the component carrier of the downlink is changed or only the component carrier of the uplink is changed during communication is shown herein.

Figure 24:
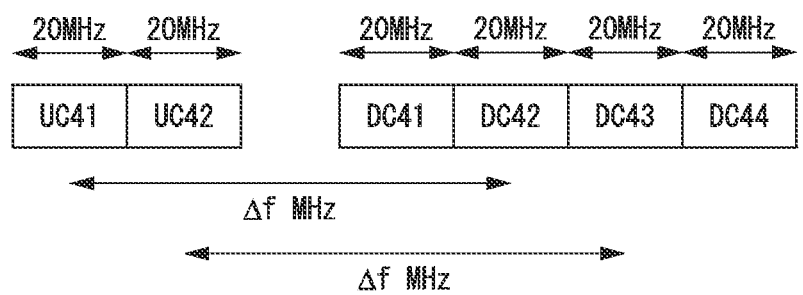
FIG. 24 is an example of component carriers of an uplink and a downlink available to a mobile communication system 10d in a fifth embodiment of the present invention.

FIG. 24 is an example of component carriers of an uplink and a downlink available to the mobile communication system 10d in the present embodiment. A bandwidth of each component carrier is 20 MHz. Component carriers UC41 and UC42 of the uplink are continuously arranged in a frequency direction. Component carriers DC41, DC42, DC43 and DC44 of the downlink are also continuously arranged in the frequency direction. A center frequency interval between the component carrier UC41 and the component carrier DC42 and a center frequency interval between the component carrier UC2 and the component carrier DC3 are Δf MHz.

Figure 25:
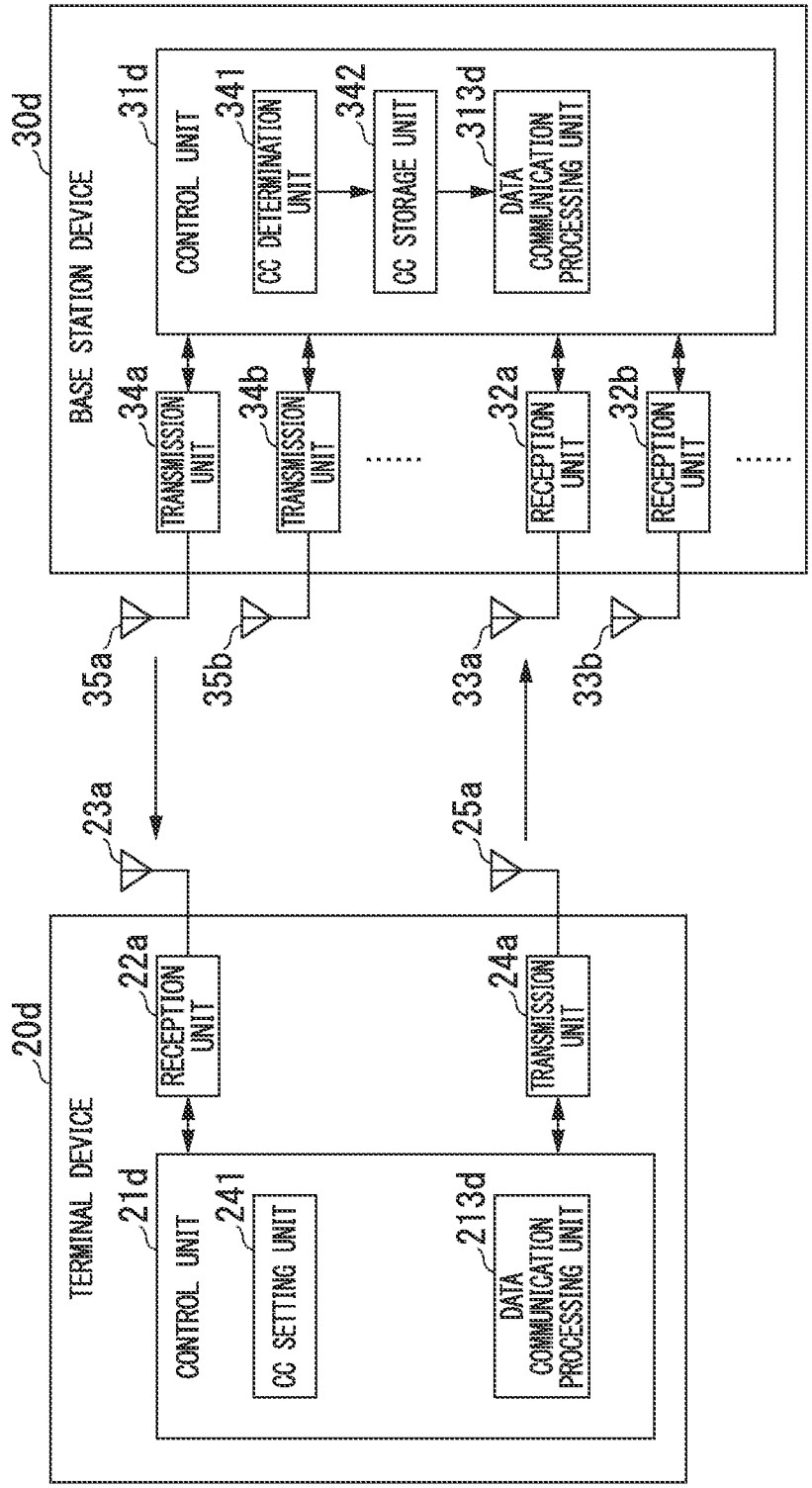
FIG. 25 is a schematic block diagram showing configurations of a terminal device 20d and a base station device 30d in the fifth embodiment.

The mobile communication system 10d includes a terminal device 20d and a base station device 30d. FIG. 25 is a schematic block diagram showing configurations of the terminal device 20d and the base station device 30d. In FIG. 25, the same reference numerals (22a to 25a, 32a, 32b . . . to 35a, 35b . . . ) are given to units corresponding to those in FIG. 3, and a description of the units will be omitted. The terminal device 20d includes a control unit 21d, a reception unit 22a, a reception antenna 23a, a transmission unit 24a, and a transmission antenna 25a. The control diagram 21d includes a CC (component carrier) setting unit 241, and a data communication processing unit 213d. The base station device 30d includes a control unit 31d, reception units 32a, 32b . . . , reception antennas 33a, 33b . . . , transmission units 34a, 34b . . . , and transmission antennas 35a, 35b . . . The control unit 31d includes a CC determination unit 341, a CC storage unit 342, and a data communication processing unit 313d. Also, while one terminal device 20d is shown in FIG. 25, the base station device 30d can simultaneously perform wireless communication with a plurality of terminal devices 20d.

The CC determination unit 341 determines a change of a component carrier used for communication with the terminal device 20d according to a propagation path quality of each component carrier and a traffic amount, and notifies of information for identifying the component carrier to be used after changing, as the component carrier setting request, using the transmission unit according to the component carrier used for communication among the transmission units 34a, 34b . . . Further, the CC determination unit 341 causes the notified information for identifying the component carrier to be stored in the CC storage unit 342 in association with the information for identifying the terminal device 20d. The CC storage unit 342 stores the information for identifying the component carriers of the uplink and the downlink used for communication in association with the information for identifying the terminal device 20d. The data communication processing unit 313d reads the information for identifying the terminal device 20d and the information for identifying the component carriers stored in the CC storage unit 342 and performs data communication with the terminal device 20d according to the read information. That is, the data communication processing unit 313d performs communication using the component carriers associated with the information for identifying the terminal device 20d via the transmission unit and the reception unit according to the component carriers.

The CC setting unit 241 receives the component carrier setting request transmitted from the base station device 30d via the reception unit 22a, and changes the setting of the carrier frequency of the reception unit 22a or the transmission unit 24a according to the component carrier identified by the received component carrier setting request. The data communication processing unit 213d performs the data communication with the base station device 30d via the reception unit 22a or the transmission unit 24a.

FIG. 26 shows a communication sequence diagram when only the component carrier of the downlink is changed during communication. The terminal device 20d first performs communication with the base station device 30d using the component carrier UC41 of the uplink and the component carrier DC42 of the downlink (Sf1 and Sf2). In this case, the transmission and reception frequency interval is Δf MHz, as previously described with reference to FIG. 24. Then, the traffic amount of the component carrier DC42 becomes great or the propagation path quality is degraded (Sf3), and, in order to change from the component carrier DC42 of the downlink to DC41, the base station device 30d performs a notification to change to the component carrier DC41 of the downlink using a component carrier setting request having the same format as any of the carrier aggregation setting requests described in the first to fourth embodiments (Sf4; a notification of a change to DC41; a component carrier setting request). The terminal device performs a carrier change into the component carrier DC41 based on the notified information, and changes the transmission and reception interval to Δf-20 MHz (Sf5).

Accordingly, communication of the component carrier DC41 and the component carrier UC41 is established (Sf6; communication establishment (transmission and reception frequency interval Δf-20 MHz). By doing so, it is possible to realize the change from the component carrier DC42 to the component carrier DC41. The UC can be changed using the same method as the method of changing the DC.

From the above, even in the mobile communication system in which one component carrier of the uplink and one component carrier of the downlink are used to perform the communication, only the component carrier of the downlink can be changed or only the component carrier of uplink can be changed during the communication using the CA transmission and reception frequency and the association information notification signal having the same format as that described in the first to fourth embodiments.

Further, a program for realizing the functions of the control unit 21 and the control unit 31 in FIG. 3, and the control unit 21a and the control unit 31a in FIG. 11, the control unit 21B and the control unit 31b in FIG. 20, the control unit 21c and the control unit 31c in FIG. 22, and the control unit 21d and the control unit 31d in FIG. 25 may be recorded in a computer-readable recording medium. The program recorded in the recording medium may be read and executed by a computer system to perform the process in each unit. Further, the "computer system" cited herein includes an OS or hardware such as peripheral devices.

Further, the "computer-readable recording medium" refers to a portable medium such as a flexible disk, a magnetic optical disc, a ROM or a CD-ROM, or a storage unit such as a hard disk embedded in the computer system. The "computer-readable recording medium" also includes a recording medium that dynamically holds a program for a short time, like a communication line in a case in which the program is transmitted via a network such as the Internet or a communication line such as a telephone line, or a recording medium that holds a program for a certain time, like a volatile memory in the computer system including a server and a client in the above case. Further, the program may be a program for realizing some of the above-described functions or a program capable of realizing the above-described functions through a combination with a program already recorded in the computer system.

While the embodiments of the present invention have been described above with reference to the drawings, a concrete configuration is not limited to the embodiments and, for example, design changes without departing from the scope and spirit of the present invention fall within the present invention.

REFERENCE SYMBOLS

10: Mobile communication system
20, 20a, 20b, 20c, 20d: Terminal device
21, 21a, 21B, 21c, 21d: Control unit
22a, 22b: Reception unit
23a, 23b: Reception antenna
24a, 24b: Transmission unit
25a, 25b: Transmission antenna
30, 30a, 30b, 30c, 30d: Base station device
31, 31a, 31b, 31c, 31d: Control unit
32a, 32b: Reception unit
33a, 33b: Reception antenna
34a, 34b: Transmission unit
35a, 35b: transmission antenna
211, 211a, 211b, 211c: CA setting unit
212: CA storage unit
213, 213d: Data communication processing unit
221: group acquisition unit
222: Group storage unit
231: CA pattern acquisition unit
232: CA pattern storage unit
241: CC setting unit
310: Association candidate storage unit
311, 311a, 311c: CA Determination unit
312: CA storage unit
313, 313d: Data communication processing unit
321: Group notification unit
322: Group storage unit
331, 334: CA pattern storage unit
332, 333: CA pattern notification unit
341: CC determination unit
342: CC storage unit

The invention claimed is:

1. A wireless communication system comprising:
a terminal station device; and
a base station device,
wherein the base station device comprises:
transmitting, to the terminal station device, first information indicating carrier frequencies of one or more first frequency bands used for an uplink of a plurality of frequency bands for carrier aggregation (CA), second information indicating carrier frequencies of one or more second frequency bands used for a downlink of the plurality of frequency bands for the CA, and third information indicating association between each of the first frequency bands used for the uplink and each of the second frequency bands used for the downlink, in a case of changing the number of the plurality of frequency bands simultaneously available, wherein
the number of the first frequency bands or the number of the second frequency bands before transmission is different from the number of the first frequency bands or the number of the second frequency bands after transmission,
the terminal station device comprises:
receiving, from the base station device, the first information, the second information and the third information.

2. A base station device comprising:
a receiver configured to receive, from a terminal station device, transmission signals; and
a transmitter configured to transmit, to the terminal station device, first information indicating carrier frequencies of one or more first frequency bands used for an uplink of a plurality of frequency bands for carrier aggregation (CA), second information indicating carrier frequencies of one or more second frequency bands for a downlink of the plurality of frequency bands for the CA, and third information indicating association between each of the first frequency bands used for the uplink and each of the second frequency bands used for the downlink, in a case of changing the number of the plurality of frequency bands simultaneously available, wherein
the number of the first frequency bands or the number of the second frequency bands before transmission is different from the number of the first frequency bands or the number of the second frequency bands after transmission.

3. The base station device according to claim 2, wherein the transmitter is configured to transmit the first information, the second information and the third information using a third frequency band for communicating with the terminal device.

4. A method for a base station device, the method comprising:
transmitting, to a terminal station device, first information indicating carrier frequencies of one or more first frequency bands used for an uplink of a plurality of frequency bands for carrier aggregation (CA), second information indicating carrier frequencies of one or more second frequency bands used for a downlink of the plurality of frequency bands for the CA, and third information indicating association between each of the first frequency bands used for the uplink and each of the second frequency bands used for the downlink, in a case of changing the number of the plurality of frequency bands simultaneously available, wherein
the number of the first frequency bands or the number of the second frequency bands before transmission is different from the number of the first frequency bands or the number of the second frequency bands after transmission.

5. A terminal station device comprising:
a transmitter configured to transmit, to a base station device, transmission signals; and
a receiver configured to receive, from the base station device, first information indicating carrier frequencies of one or more a-first frequency bands used for an uplink of a plurality of frequency bands for carrier aggregation (CA), second information indicating carrier frequencies of one or more second frequency bands used for a downlink of the plurality of frequency bands for the CA, and third information indicating association between each of the first frequency bands used for the uplink and each of the second frequency band used for the downlink, in a case of changing the number of the plurality of frequency bands simultaneously available, wherein
the number of the first frequency bands or the number of the second frequency bands before transmission is different from the number of the first frequency bands or the number of the second frequency bands after transmission.

6. The terminal station device according to claim 5, wherein the receiver is configured to receive the first information, the second information and the third information using a third frequency band for communicating with the base station device.

7. A method for a terminal station device, the method comprising:
receiving, from a base station device, first information indicating carrier frequencies of one or more first frequency bands used for an uplink of a plurality of frequency bands for carrier aggregation (CA), second information indicating carrier frequencies of one or more second frequency bands used for a downlink of the plurality of frequency bands for the CA, and third information indicating association between each of the first frequency bands used for the uplink and each of the second frequency bands used for the downlink, in a case of changing the number of the plurality of frequency bands simultaneously available, wherein
the number of the first frequency bands or the number of the second frequency bands before transmission is different from the number of the first frequency bands or the number of the second frequency bands after transmission.

* * * * *